(12) United States Patent
Rumynin et al.

(10) Patent No.: US 6,883,011 B2
(45) Date of Patent: Apr. 19, 2005

(54) PARALLEL COUNTER AND A MULTIPLICATION LOGIC CIRCUIT

(75) Inventors: Dmitriy Rumynin, Coventry (GB); Sunil Talwar, Leamington Spa (GB); Peter Meulemans, Coventry (GB)

(73) Assignee: Arithmatica Limited, Leamington Spa (GB)

( * ) Notice: Subject to any disclaimer, the term of this patent is extended or adjusted under 35 U.S.C. 154(b) by 160 days.

(21) Appl. No.: 09/769,954

(22) Filed: Jan. 25, 2001

(65) Prior Publication Data

US 2002/0026465 A1 Feb. 28, 2002

Related U.S. Application Data

(63) Continuation-in-part of application No. 09/637,532, filed on Aug. 11, 2000.

(30) Foreign Application Priority Data

Aug. 4, 2000 (GB) ............................................. 0019287

(51) Int. Cl.$^7$ ............................................... G06F 7/00
(52) U.S. Cl. ...................................... 708/210; 708/626
(58) Field of Search ......................................... 708/210

(56) References Cited

U.S. PATENT DOCUMENTS 3,634,658 A  1/1972  Brown ......................... 235/92
3,757,098 A  9/1973  Wright ......................... 235/175

(Continued)

FOREIGN PATENT DOCUMENTS

| EP | 0168650 | 1/1986 | ........... G06F/15/60 |
| EP | 0309292 | 3/1989 | ........... G06F/15/60 |
| EP | 0442356 | 8/1991 | |
| EP | 0741354 | 11/1996 | ............. G06F/7/60 |
| FR | 2475250 | 8/1981 | ............. G06F/7/38 |
| GB | 2016181 | 9/1979 | ............. G06F/7/39 |
| GB | 2062310 | 5/1981 | ............. G06F/7/52 |
| GB | 2365636 | 2/2002 | ............. G06F/7/60 |
| GB | 2365637 | 2/2002 | ............. G06F/7/60 |
| WO | WO-99/22292 | 5/1999 | |
| WO | WO-02/12995 | 2/2002 | ............. G06F/7/00 |

OTHER PUBLICATIONS

Booth, A.D., "A Signed Binary Multiplication Technique", *Oxford University Press*, Reprinted from Q.J. Mech. Appl. Math. 4:236–240, pp. 100–104, (1951).

(Continued)

*Primary Examiner*—D. H. Malzahn
(74) *Attorney, Agent, or Firm*—Schwegman, Lundberg, Woessner & Kluth, P.A.

(57) ABSTRACT

A parallel counter comprises logic for generating output bits as symmetrical functions of the input bits. The parallel counter can be used in a multiplication circuit. A multiplication circuit is also provided in which an array of combinations of each bit of a binary number with each other bit of another binary number is generated having a reduced form in order to reduce the steps required in array reduction.

19 Claims, 26 Drawing Sheets

U.S. PATENT DOCUMENTS

Figure 1:
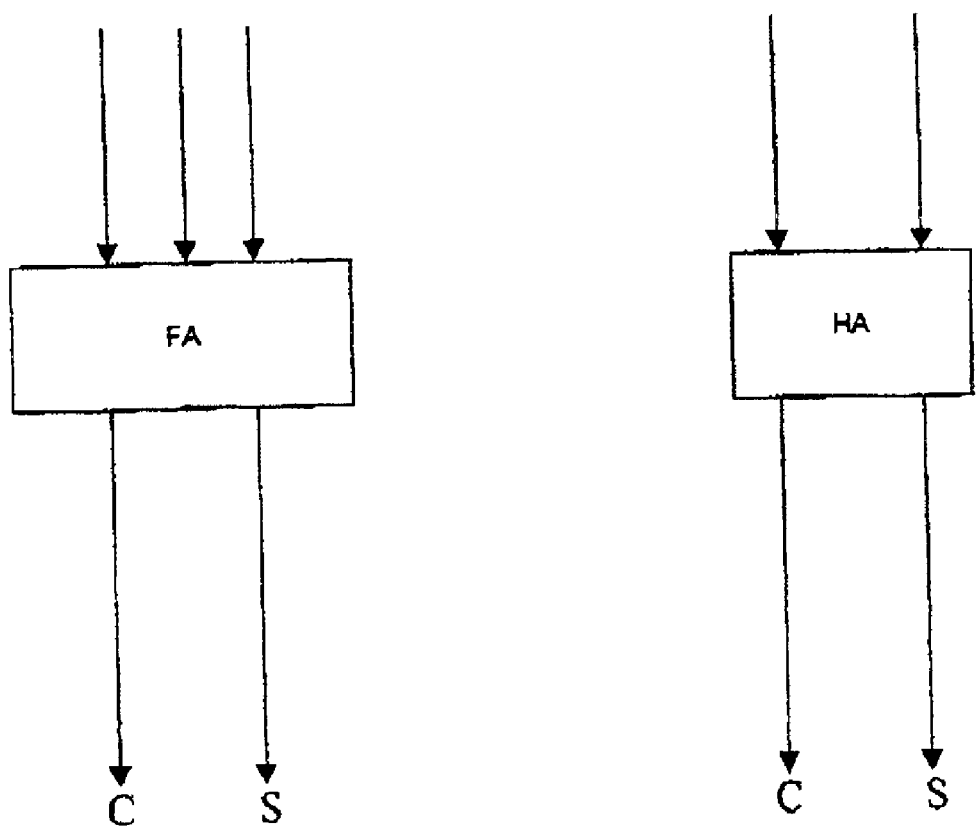

| | | | | |
|---|---|---|---|---|
| 4,399,517 A | * | 8/1983 | Niehaus et al. | 708/210 |
| 4,596,256 A | | 6/1986 | Ascher et al. | 128/710 |
| 4,607,176 A | | 8/1986 | Burrows et al. | 307/449 |
| 4,993,421 A | | 2/1991 | Thornton | 128/670 |
| 5,095,457 A | | 3/1992 | Jeong | 364/758 |
| 5,175,862 A | | 12/1992 | Phelps et al. | 395/800 |
| 5,187,679 A | * | 2/1993 | Vassiliadis et al. | 708/706 |
| D341,423 S | | 11/1993 | Bible | D24/167 |
| 5,325,320 A | * | 6/1994 | Chiu | 708/629 |
| 5,343,417 A | * | 8/1994 | Flora | 708/626 |
| 5,497,342 A | | 3/1996 | Mou et al. | 364/786 |
| 5,524,082 A | | 6/1996 | Horstmann et al. | 364/489 |
| D377,983 S | | 2/1997 | Sabri et al. | D24/167 |
| D407,159 S | | 3/1999 | Roberg | D24/167 |
| 5,964,827 A | | 10/1999 | Ngo et al. | 708/710 |
| 5,995,029 A | | 11/1999 | Ryu | 341/101 |
| 6,023,566 A | | 2/2000 | Belkhale et al. | 395/500.03 |
| 6,175,852 B1 | | 1/2001 | Dhong et al. | |
| 6,269,386 B1 | | 7/2001 | Siers et al. | 708/710 |
| 6,490,608 B1 | * | 12/2002 | Zhu | 708/626 |
| 2002/0026465 A1 | | 2/2002 | Rumynin et al. | 708/210 |
| 2002/0078110 A1 | | 6/2002 | Rumynin et al. | 708/210 |

OTHER PUBLICATIONS

Dadda, L., "On Parallel Digital Multipliers", *Associazione Elettrontecnia ed Elettronica Italiana*, Reprinted from Alta Freq. 45:574–580, pp. 126132, (1976).

Dadda, L., "Some Schemes For Parallel Multipliers", *Assocciazione Elettrotenica ed Elettronica Italiana*, Reprinted from Alta Freq. 34:349–356, pp. 118–125, (1965).

Foster, C.C., et al., "Counting Responders in an Associative Memory", *The Institute of Electrical and Electronics Engineers, Inc.*, Reprinted, with permission, from IEEE Trans. Comput. C–20:1580–1583, pp. 86–89, (1971).

Swartzlander, Jr., E.E., "Parallel Counters", *Institute of Electrical and Electronic Engineers, Inc., Reprinted, with permission from IEEE Trans. Comput. C–22:1021–1024*, pp. 14–17, (1973).

Wallace, C.S., "A Suggestion for a Fast Multiplier", *The Institute of Electrical and Electronics Engineers, Inc.*, Reprinted, with permission, from IEEE Trans. Electron. Comput. EC–13:14–17, pp. 14–17, (1964).

Jones, R.F., et al., "Parallel Counter Implementation", *Conf. Rec. 26th Asilomar Conf. Signals, Systems & Computers*, vol. 1, ISBN 0–8186–3160–0, pp. 381–385, (1992).

Fleisher, H., "Combinatorial Techniques for Performing Arithmetic and Logical Operations", *IBM Research Center*, RC–289, Research Report, pp. 1–20, (Jul. 18, 1960).

Ho, I.T., et al., "Multiple Addition by Residue Threshold Functions and Their Representation By Array Logic", *The Institute of Electrical and Electronics Engineers, Inc.*, Trans. Comput. C–22: 762–767, pp. 80–85, (1973).

Chakraborty, S.,et al. ,"Synthesis of Symmetric Functions for Path–Delay Fault Testability", *12th International Conference on VLSI Design*, (1999),pp. 512–517.

Debnath, D.,"Minimization of AND–OR–EXOR Three–Level Networks with AND Gate Sharing", *IEICE Trans. Inf. & Syst., E80–D, 10*, (1997),pp. 1001–1008.

Drechsler, R.,et al. ,"Sympathy: Fast Exact Minimization of Fixed Polarity Reed–Muller Expressions for Symmetric Functions", *IEEE Transactions on Computer–Aided Design of Integrated Circuits and Systems, 16(1)*, (1997),pp. 1–5.

Drechsler, R.,et al. ,"Sympathy: Fast Exact Minimization of Fixed Polarity Reed–Muller Expressions for Symmetric Functions", *IEEE*, (1995),pp. 91–97.

Jones, Jr., R..,et al. ,"Parallel Counter Implementation", *IEEE*, (1992),pp. 381–385.

Nienhaus, H.,"Efficient Multiplexer Realizations of Symmetric Functions", *IEEE*, (1981), pp. 522–525.

Vassiliadis, S.,et al. ,"7/2 Counters and Multiplication with Threshold Logic", *IEEE*, (1997), pp. 192–196.

Goto, et al., "A 54 ×54–b Regularly Structured Tree Multiplier", *IEEE Journal of Solid–State Circuits, vol. 27, No. 9*, (Sep. 1992),1229–1236.

Hekstra, et al., "A Fast Parallel Multiplier Architecture", *IEEE International Symposium on Circuits and Systems; Institute of Electrical and Electronic Engineers, c1977–c1996, 20v. :ill. :28cm*, (1992),2128–2131.

Oklobdzija, V G., et al., "Improving multiplier design by using improved column compression tree and optimized final adder in CMOS technology", *IEEE transactions on Very Large Scale Integration (VLSI) Systems, IEEE, Inc, New York, vol. 3, No. 2*,(Jun. 1995),292–301.

Zuras, D , et al., "Balanced delay trees and combinatorial division in VLSI", *IEEE Journal of Solid State Circuits, IEEE Inc, New York, vol. SC–21, No. 5*,(Oct. 1986),814–819.

Bedrij, O. J., "Carry–Select Adder", *IRE Trans., EC–11*, (Jun. 1962),340–346.

Knowles, S. , "A Family of Adders", *Proc. 14th IEEE Symp. on Computer Arithmetic*, (1999),30–34.

Kogge, P. M., et al., "A Parallel Algorithm for the Efficient Solution of a General Class of Recurrence Equations", *IEEE Trans. Computers, vol. C–22, No. 8*, (Aug. 1973),788–793.

Ladner, Richard E., et al., "Parallel Prefix Computation", *Journal of ACM, vol. 27, No. 4*, (Oct. 1980),831–838.

Ling, Huey , "High–Speed Binary Adder", *IBM Journal of Research and Development, vol. 25, No. 3*, (1981),156–166.

Sklansky, J. , "Conditional–Sum Addition Logic", *IRE Trans., EC–9*, (Jun. 1960),226–231.

Weinberger, A. , et al., "A Logic for High–Speed Addition", *Nat. Bur. Stand. Circ., 591*, (1958),3–12.

* cited by examiner

OR_3_1

OR_4_1

OR_5_1

EXOR_7_1

BLOCK 4

PARALLEL COUNTER AND A MULTIPLICATION LOGIC CIRCUIT

CROSS-REFERENCE TO RELATED APPLICATIONS

This application is a continuation-in-part of U.S. application Ser. No. 09/637,532, filed on Aug. 11, 2000, which claims priority of Great Britain Application No. 0019287.2, filed on Aug. 4, 2000, all of which are incorporated herein by reference.

The present invention generally relates to digital electronic devices and more particularly to a digital electronic device performing binary logic. In one aspect the present invention relates to a parallel counter and in another aspect the present invention relates to a multiplication logic circuit for multiplying two binary numbers.

It is instrumental for many applications to have a block that adds n inputs together. An output of this block is a binary representation of the number of high inputs. Such blocks, called parallel counters (L. Dadda, *Some Schemes for Parallel Multipliers*, Alta Freq 34: 349–356 (1965); E. E. Swartzlander Jr., *Parallel Counters*, IEEE Trans. Comput C-22: 1021–1024 (1973)), are used in circuits performing binary multiplication. There are other applications of a parallel counter, for instance, majority-voting decoders or RSA encoders and decoders. It is important to have an implementation of a parallel counter that achieves a maximal speed. It is known to use parallel counters in multiplication (L. Dadda, *On Parallel Digital Multipliers*, Alta Freq 45: 574–580 (1976)).

A full adder is a special parallel counter with a three-bit input and a two-bit output. A current implementation of higher parallel counters i.e. with a bigger number of inputs is based on using full adders (C. C. Foster and F. D. Stockton, *Counting Responders in an Associative Memory*, IEEE Trans. Comput. C-20: 1580–1583 (1971)). In general, the least significant bit of an output is the fastest bit to produce in such implementation while other bits are usually slower.

The following notation is used for logical operations:

⊕—Exclusive OR;
∨—OR;
∧—AND;
¬—NOT.

An efficient prior art design (Foster and Stockton) of a parallel counter uses full adders. A full adder, denoted FA, is a three-bit input parallel counter shown in FIG. 1. It has three inputs $X_1$, $X_2$, $X_3$, and two outputs S and C. Logical expressions for outputs are $S = X_1 \oplus X_2 \oplus X_3$, $C = (X_1 \wedge X_2) \vee (X_1 \wedge X_3) \vee (X_2 \wedge X_3)$.

A half adder, denoted HA, is a two bit input parallel counter shown in FIG. 1. It has two inputs $X_1$, $X_2$ and two outputs S and C. Logical expressions for outputs are $S = X_1 \oplus X_2$, $C = X_1 \wedge X_2$.

Figure 2:
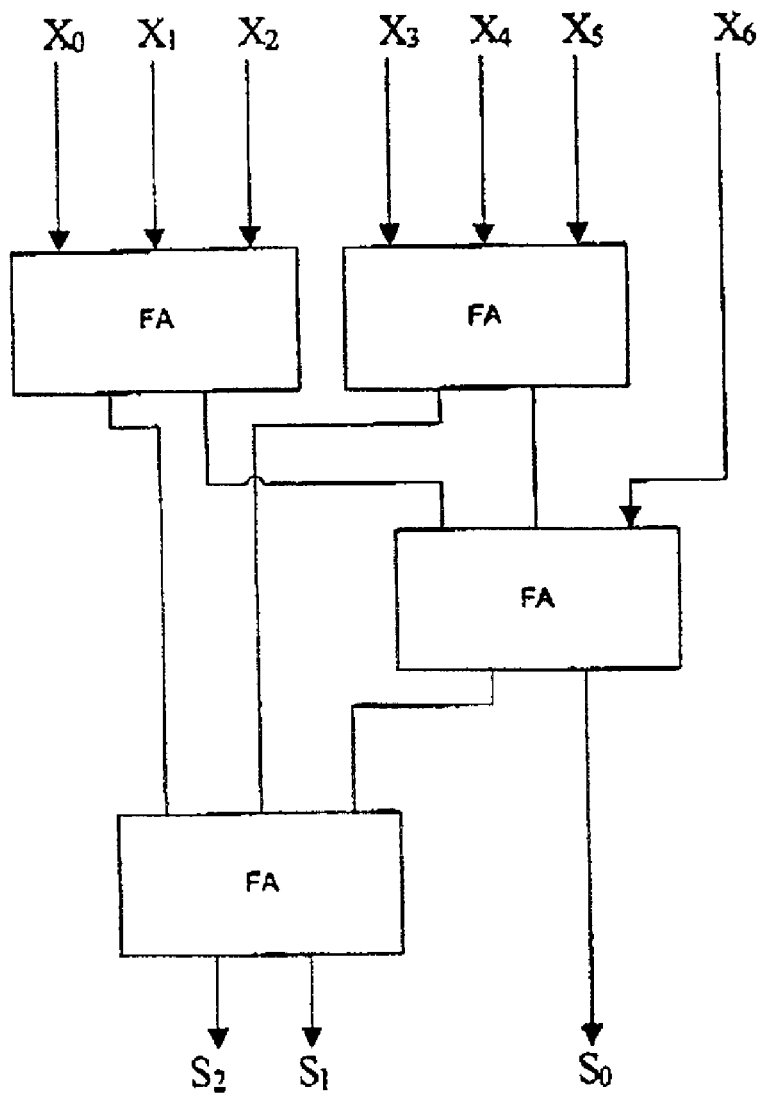

A prior art implementation of a seven-bit input parallel counter illustrated in FIG. 2.

Multiplication is a fundamental operation. Given two n-digit binary numbers $A_{n-1}2^{n-1} + A_{n-2}2^{n-2} + \ldots + A_1 2 + A_0$ and $B_{n-1}2^{n-1} + B_{n-2}2^{n-2} + \ldots + B_1 2 + B_0$, their product $P_{2n-1}2^{2n-1} + P_{2n-2}2^{2n-2} + \ldots + P_1 2 + P_0$ may have up to 2n digits. Logical circuits generating all $P_i$ as outputs generally follow the scheme in FIG. 14. Wallace has invented the first fast architecture for a multiplier, now called the Wallace-tree multiplier (Wallace, C. S., *A Suggestion for a Fast Multiplier*, IEEE Trans. Electron. Comput. EC-13: 14–17 (1964)). Dadda has investigated bit behaviour in a multiplier (L. Dadda, *Some Schemes for Parallel Multipliers*, Alta Freq 34: 349–356 (1965)). He has constructed a variety of multipliers and most multipliers follow Dadda's scheme.

Figure 22:
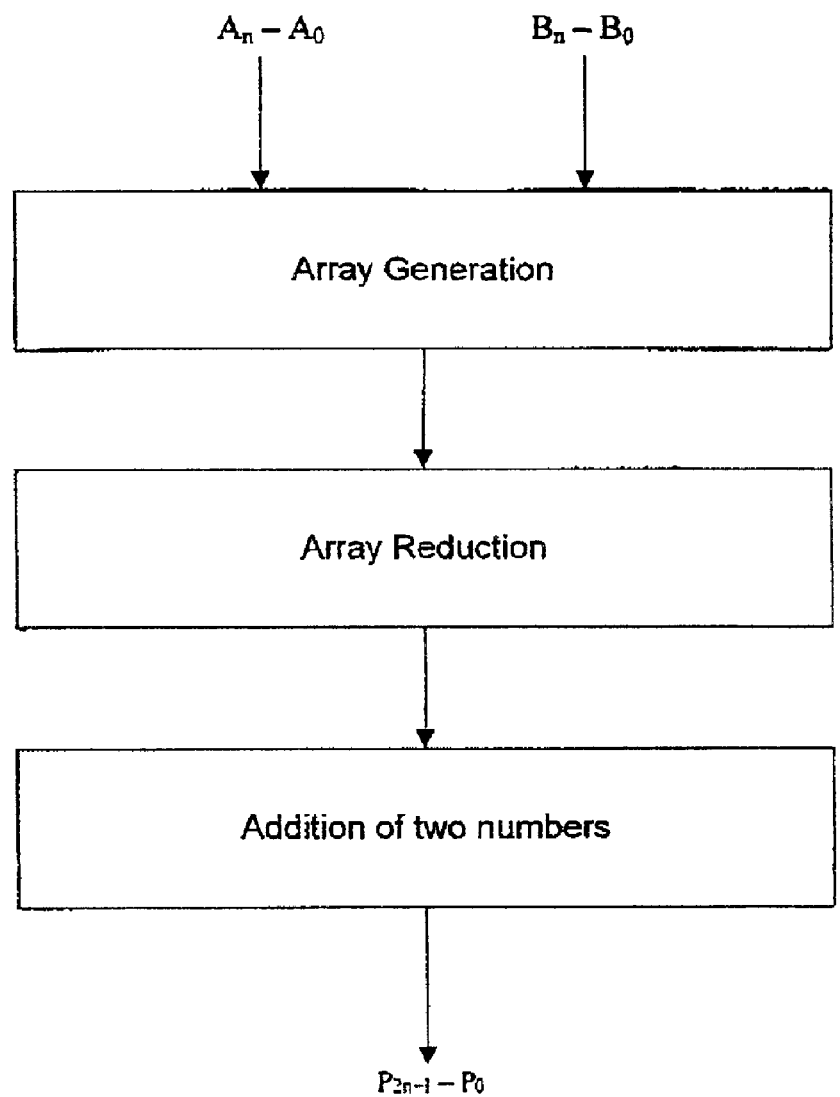
Figure 23:
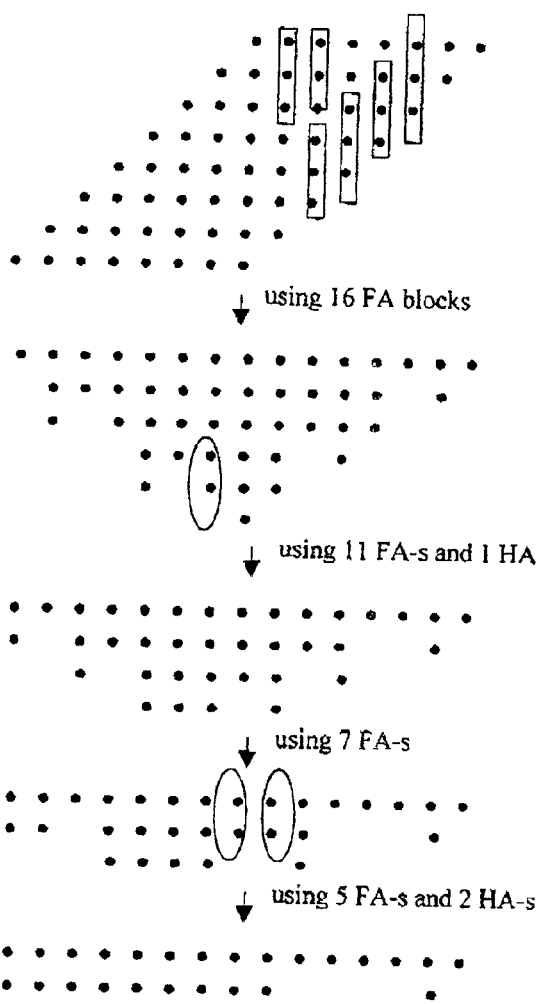

Dadda's multiplier uses the scheme in on FIG. 22. If inputs have 8 bits then 64 parallel AND gates generate an array shown in FIG. 23. The AND gate sign ∧ is omitted for clarity so that $A_i \wedge B_j$ becomes $A_i B_j$. The rest of FIG. 23 illustrates array reduction that involves fill adders (FA) and half adders (HA). Bits from the same column are added by half adders or fill adders. Some groups of bits fed into a full adder are in rectangles. Some groups of bits fed into a half adder are in ovals. The result of array reduction is just two binary numbers to be added at the last step. One adds these two numbers by one of the fast addition schemes, for instance, conditional adder or carry-look-ahead adder.

In accordance with the first aspect the present invention provides a parallel counter based on algebraic properties of symmetric functions. At least one of the binary output bits is generated as a symmetric function of a plurality of binary input bits.

The symmetric functions comprise logically AND combining sets of one or more binary inputs and logically OR or exclusive OR logic combining the logically combined sets of binary inputs to generate a binary output. The OR and the exclusive OR symmetric functions are elementary symmetric functions and the generated output binary bit depends only on the number of high inputs among the input binary bits. For the OR symmetric function if the number of high inputs is m, the output is high if and only if $m \geq k$, where k is the size of the sets of binary inputs. Similarly, the generated output binary bit using the exclusive OR symmetric function is high if and only if $m \geq k$ and the number of subsets of inputs of the set of high inputs is an odd number. In one embodiment the size of the sets can be selected. The $i^{th}$ output bit can be generated using the symmetric function using exclusive OR logic by selecting the set sizes to be of size $2^i$, where i is an integer from 1 to N, N is the number of binary outputs. and i represents the significance of each binary output.

In one embodiment the sets of binary inputs used in the symmetric functions are each unique and they cover all possible combinations of binary inputs.

This embodiment reduces the amount of fan-out in the circuit and increases the amount of logic sharing. It thus makes parallel counters for a large binary number more practicable.

In another embodiment of the present invention, the logic and inputs of the parallel counter are divided in accordance with a bay tree. The logic circuit is divided into a plurality of logic units. Each logic unit is arranged to generate logic unit binary outputs as a symmetric function of the binary inputs to the logic unit The binary inputs are divided into inputs into the plurality of logic units, and the binary outputs of the plurality of outputs are generated using binary outputs of a plurality of the logic units.

In a preferred embodiment, each of the logic units is arranged to receive $2^n$ of the binary inputs, where n is an integer indicating the level of the logic units in the binary tree, the logic circuit has m logic units at each level, where m is a rounded up integer determined from (the number of binary inputs)/$2^n$, logic units having a higher level in the binary tree comprise logic of logic units at lower levels in the binary trees and each logic unit is arranged to generate logic unit binary outputs as a symmetric function of the binary inputs to the logic unit.

In one embodiment, each logic unit at the first level is arranged to generate logic unit binary outputs as a smallest elementary symmetric function of the binary inputs to said logic circuit.

In one embodiment, each logic unit at the first level is arranged to generate logic unit binary outputs as a symmetric function of the binary inputs to the logic circuit using OR logic for combining the binary inputs.

In one embodiment, each logic unit at the first level is arranged to logically AND each of the binary inputs to the logic unit and to logically OR each of the binary inputs to the logic unit to generate the logic unit binary outputs.

In one embodiment, each logic unit at the first level is arranged to generate logic unit binary outputs as a symmetric function of the binary inputs to the logic circuit using exclusive OR logic for combining the binary inputs.

In one embodiment, each logic unit at the first level is arranged to logically AND each of the binary inputs to the logic unit and to logically exclusively OR each of the binary inputs to the logic unit to generate the logic unit binary outputs.

In one embodiment, elementary logic units are provided as the logic units at the first level for performing elementary symmetric functions, outputs from each of two primary elementary logic units receiving four logically adjacent binary inputs from said plurality of inputs are input to two secondary elementary logic units, an output from each of the secondary elementary logic units is input to a tertiary elementary logic unit, and the primary, secondary and tertiary elementary logic units form a secondary logic unit at a second level of the binary tree having a binary output comprising a binary output from each of the secondary elementary logic units and two binary outputs from the tertiary elementary logic unit.

In one embodiment, tertiary logic units at a third level of the binary tree each comprise two secondary logic units receiving eight logically adjacent binary inputs from the plurality of inputs, four elementary logic units receiving as inputs the outputs of the two secondary logic units, and further logic for generating binary outputs as a symmetric function of the binary inputs to the tertiary logic unit using the binary outputs of the four elementary logic units.

In one embodiment, quaternary logic units at a fourth level of the binary tree each comprise two tertiary logic units receiving sixteen logically adjacent binary inputs from the plurality of inputs, four elementary logic units receiving as inputs the outputs of the two tertiary logic units, and further logic for generating binary outputs as a symmetric function of the binary inputs to the quaternary logic unit using the binary outputs of the four elementary logic units.

In one embodiment, elementary logic units are provided as the logic units at the first level for performing the smallest elementary symmetric functions, and logic units for higher levels comprise logic units of lower levels.

In one embodiment, the logic units for higher levels above the second level comprise logic units of an immediately preceding level and elementary logic units.

In one embodiment, each logic unit at each level is arranged to generate logic unit binary outputs as a symmetric function of the binary inputs to the logic circuit using OR logic for combining the binary inputs.

In one embodiment, each logic unit at each level is arranged to generate logic unit binary outputs as a symmetric function of the binary inputs to the logic circuit using exclusive OR logic for combining the binary inputs.

In one embodiment of the present invention, each of the binary outputs can be generated using a symmetric function which uses exclusive OR logic. However, exclusive OR logic is not as fast as OR logic.

In accordance with another embodiment of the present invention at least one of the binary outputs is generated as a symmetric function of the binary inputs using OR logic for combining a variety of sets of one or more binary inputs. The logic is arranged to logically AND members of each set of binary inputs and logically OR the result of the AND operations.

Thus use of the symmetric function using OR logic is faster and can be used for generation of the most significant output bit. In such an embodiment the set size is set to be $2^{N-1}$, where N is the number of binary outputs and the $N^{th}$ binary output is the most significant.

It is also possible to use the symmetric function using OR logic for less significant bits on the basis of the output value of a more significant bit. In such a case, a plurality of possible binary outputs for a binary output less significant than the $N^{th}$ are generated as symmetric functions of the binary inputs using OR logic for combining a plurality of sets of one or more binary inputs, where N is the number of binary outputs. Selector logic is provided to select one of the possible binary outputs based on a more significant binary output value. The size of the sets used in such an arrangement for the $(N-1)^{th}$ bit is preferably $2^{N-1}+2^{n-2}$ and $2^{N-2}$ respectively and one of the possible binary outputs is selected based on the $N^{th}$ binary output value.

In one embodiment of the present invention the circuit is designed in a modular form. A plurality of subcircuit logic modules are designed, each for generating intermediate binary outputs as a symmetric function of some of the binary inputs. Logic is also provided in this embodiment for logically combining the intermediate binary outputs to generate a binary outputs.

Since OR logic is faster, in a preferred embodiment the subcircuit logic modules implement the symmetric functions using OR logic. In one embodiment the subcircuit modules can be used for generating some binary outputs and one or more logic modules can be provided for generating other binary outputs in which each logic module generates a binary output as a symmetric function of the binary inputs exclusive OR logic for combining a plurality of sets of one or more binary inputs.

Another aspect of the present invention provides a method of designing a logic circuit comprising: providing a library of logic module designs each for performing a small symmetric function; designing a logic circuit to perform a large symmetric function; identifying small symmetric functions which can perform said symmetric function; selecting logic modules from said library to perform said small symmetric functions; identifying a logic circuit in the selected logic circuit which performs a symmetric function and which can be used to perform another symmetric function; selecting the logic circuit corresponding to the identified symmetric function and using the selected logic circuit with inverters to perform said other symmetric function using the relationship between the symmetric functions:

$$OR\_n\_k(X_1 \ldots X_n) = \neg OR\_n\_(n+1-k)(\neg X_1 \ldots \neg X_n)$$

where $\neg$ *denotes an inversion, n is the number of inputs, and k is the number of sets of inputs AND combined together.*

Another aspect of the present invention provides a conditional parallel counter having m possible high inputs out of n inputs, where m<n, and n and m are integers, the counter comprising the parallel counter for counting inputs to generate p outputs for m inputs, wherein the number n of inputs to the counter is greater than $2^p$, where p is an integer.

Thus these aspects of the present invention provide a fast circuit that can be used in any architecture using parallel counters. The design is applicable to any type of technology from which the logic circuit is built.

The parallel counter in accordance with this aspect of the present invention is generally applicable and can be used in a multiplication circuit that is significantly faster than prior art implementations.

In accordance with another aspect of the present invention a technique for multiplying 2N bit binary numbers comprises an array generation step in which an array of logical combinations between the bits of the two binary numbers is generated which is of reduced size compared to the prior art.

In accordance with this aspect of the present invention, a logic circuit for multiplying 2N bit numbers comprises array generation logic for performing the logical AND operation between each bit in one binary bit and each bit in the other binary number to generate an array of logical AND combinations comprising an array of binary values, and for further logically combining logically adjacent values to reduce the maximum depth of the array to below N bits; array reduction logic for reducing the depth of the array to two binary numbers; and addition logic for adding the binary values of the two binary numbers.

When two binary numbers are multiplied together, as is conventional each bit $A_i$ of the first binary number is logically AND combined with each bit $B_j$ of the second number to generate the array which comprises a sequence of binary numbers represented by the logical AND combinations, $A_i$ AND $B_j$. The farther logical combinations are carried out by logically combining the combinations $A_1$ AND $B_{N-2}$, $A_1$ AND $B_{N-1}$, $A_0$ AND $B_{N-2}$, and $A_0$ AND $B_{N-1}$, when N is the number of bits in the binary numbers. In this way the size of the maximal column of numbers to be added together in the array is reduced.

More specifically the array generation logic is arranged to combine the combinations $A_1$ AND $B_{n-2}$ and $A_0$ AND $B_{n-1}$ using exclusive OR logic to replace these combinations and to combine $A_1$ AND $B_{N-1}$ and $A_0$ AND $B_{n-2}$ to replace the $A_1$ AND $B_{n-1}$ combination.

In one embodiment of the present invention the array reduction logic can include at least one of: at least one full adder, at least one half adder, and at least one parallel counter. The or each parallel counter can comprise the parallel counter in accordance with the first aspects of the present invention.

This aspect of the present invention provides a reduction of the maximal column length in the array thereby reducing the number of steps required for array reduction. When the first aspect of the present invention is used in conjunction with the second aspect of the present invention, an even more efficient multiplication circuit is provided.

Figure 3:
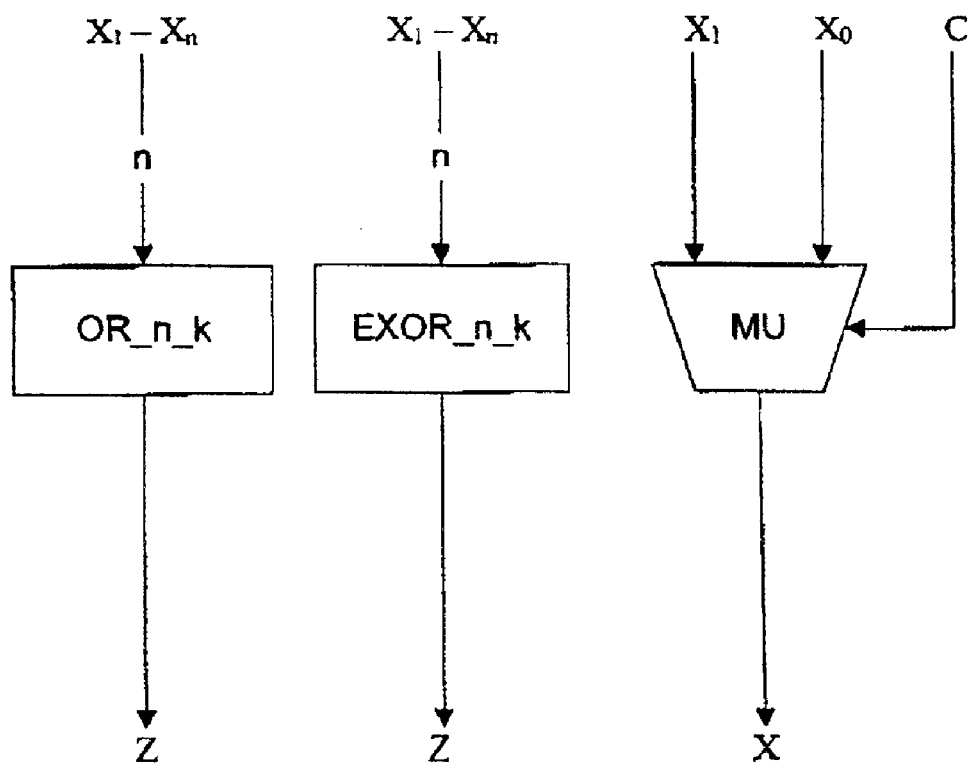
Figure 4:
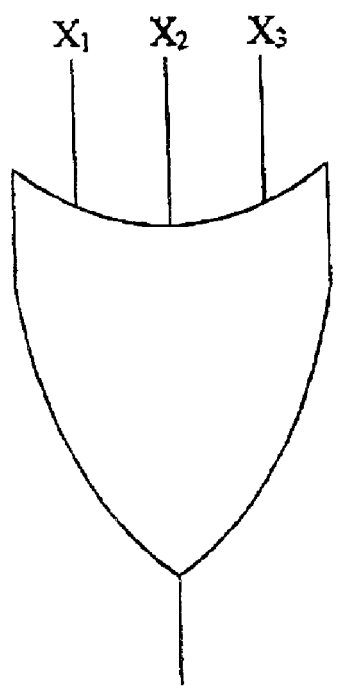
Figure 5:
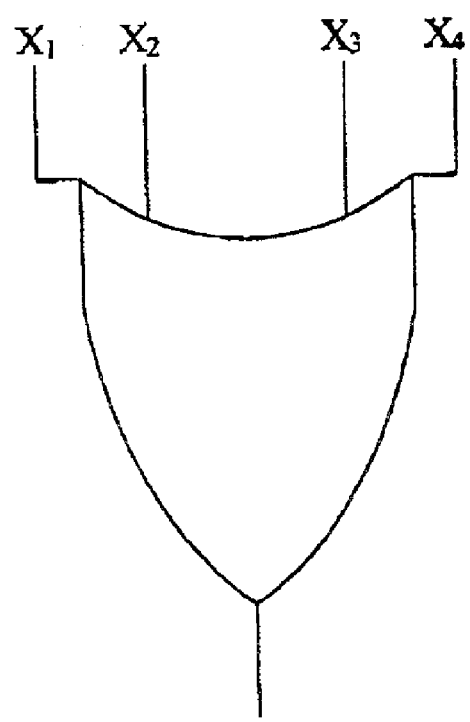
Figure 6:
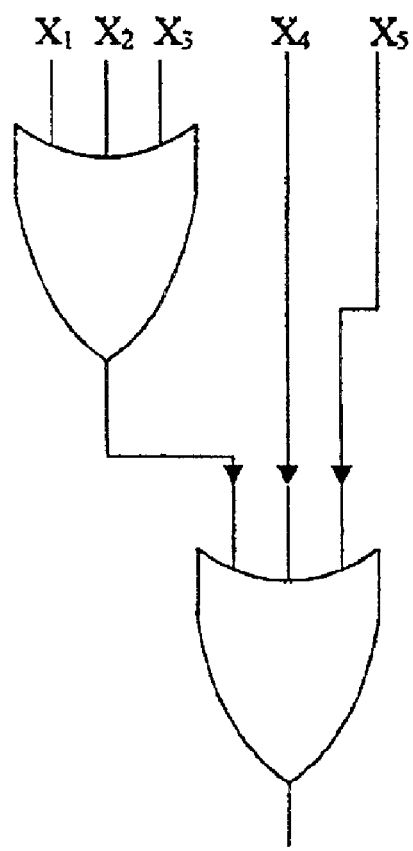
Figure 7:
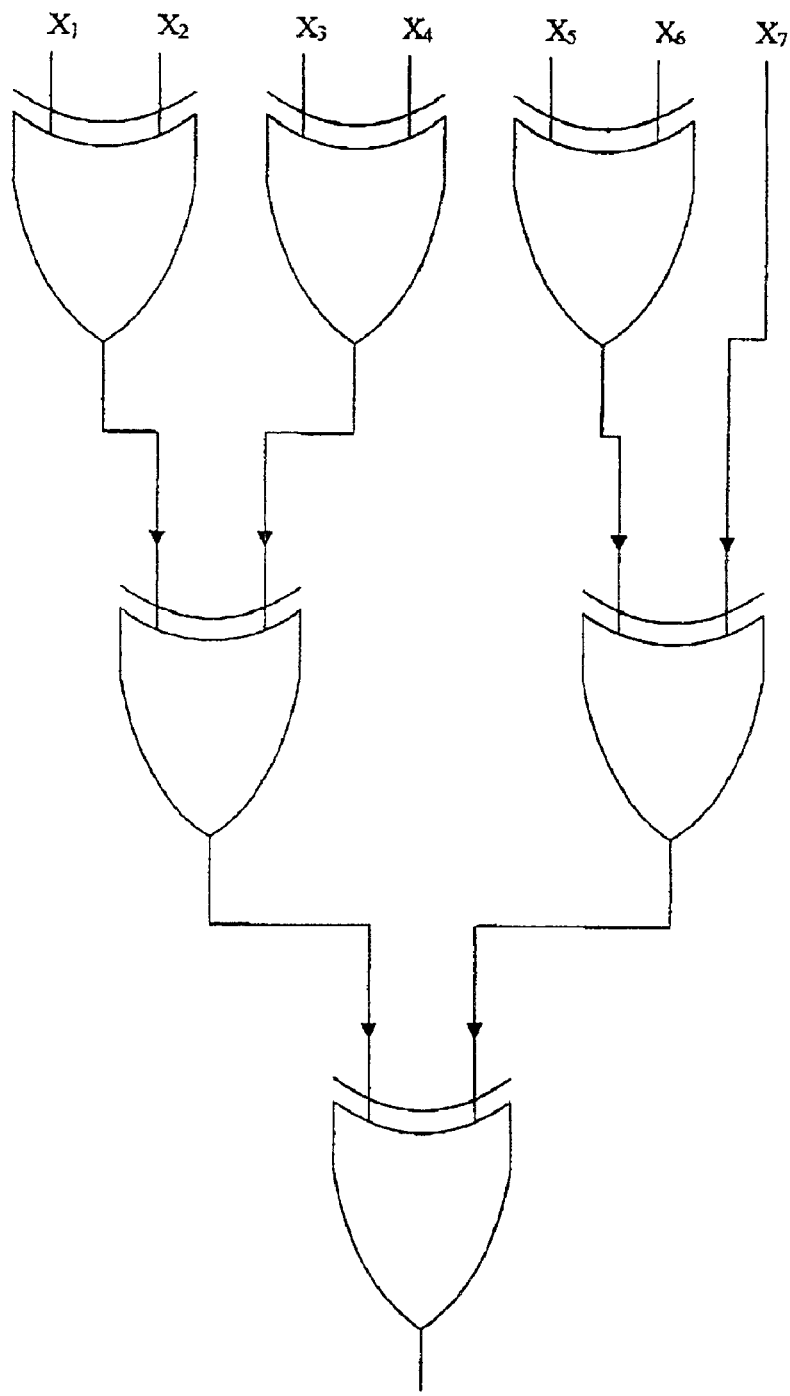
Figure 8:
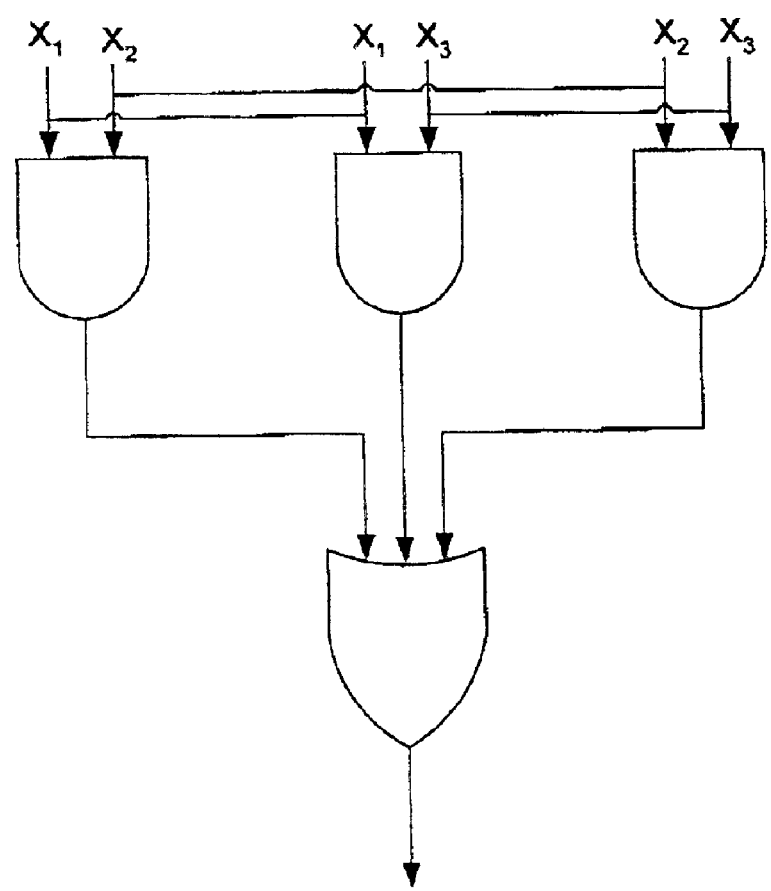
Figure 9:
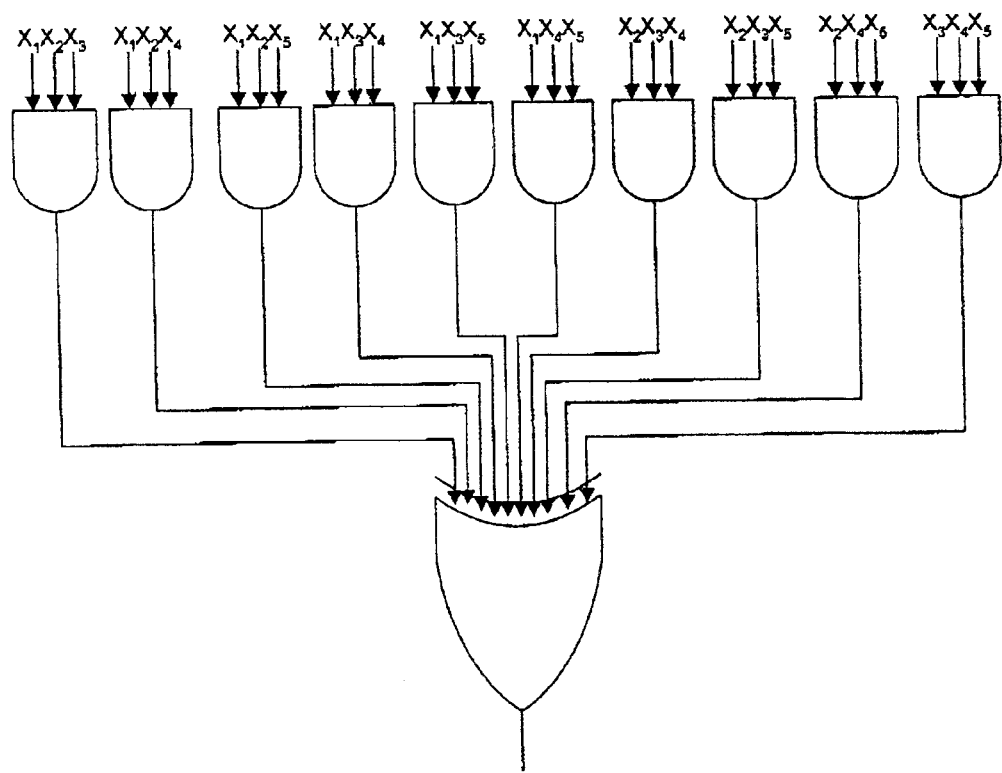

Embodiments of the present invention will now be described with reference to the accompanying drawings, in which:

FIG. 1 is a schematic diagram of a full adder and a half adder in accordance with the prior art, FIG. 2 is a schematic diagram of a parallel counter using full adders in accordance with the prior art, FIG. 3 is a schematic diagram illustrating the logic modules executing the symmetric functions for the generation of binary outputs and the multiplexor (selector) used for selecting outputs, FIG. 4 is a diagram illustrating the logic for implementing the symmetric function OR_3_1 according to one embodiment of the present invention, FIG. 5 is a diagram illustrating the logic for implementing the symmetric function OR_4_1 according to one embodiment of the present invention, FIG. 6 is a diagram illustrating the logic for implementing the symmetric function OR_5_1 using 2 3 input OR gates according to one embodiment of the present invention, FIG. 7 is a diagram illustrating the logic for implementing the symmetric function EXOR_7_1 using two input exclusive OR gates according to one embodiment of the present invention, FIG. 8 is a diagram illustrating the logic for implementing the symmetric function OR_3_2 according to one embodiment of the present invention, FIG. 9 is a diagram illustrating the logic for implementing the symmetric function EXOR_5_3 according to one embodiment of the present invention.

Figure 10:
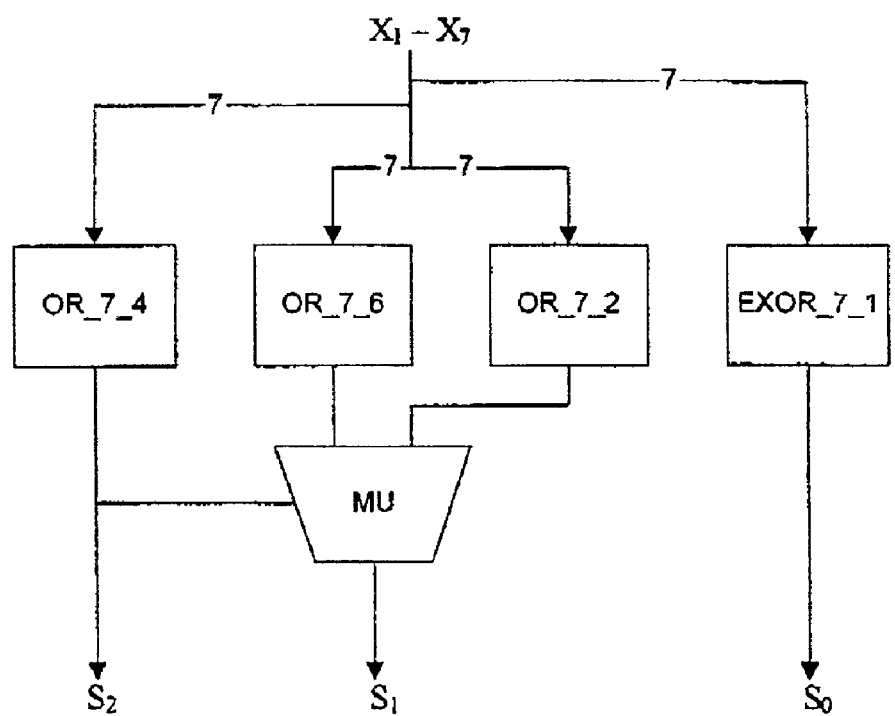
Figure 11:
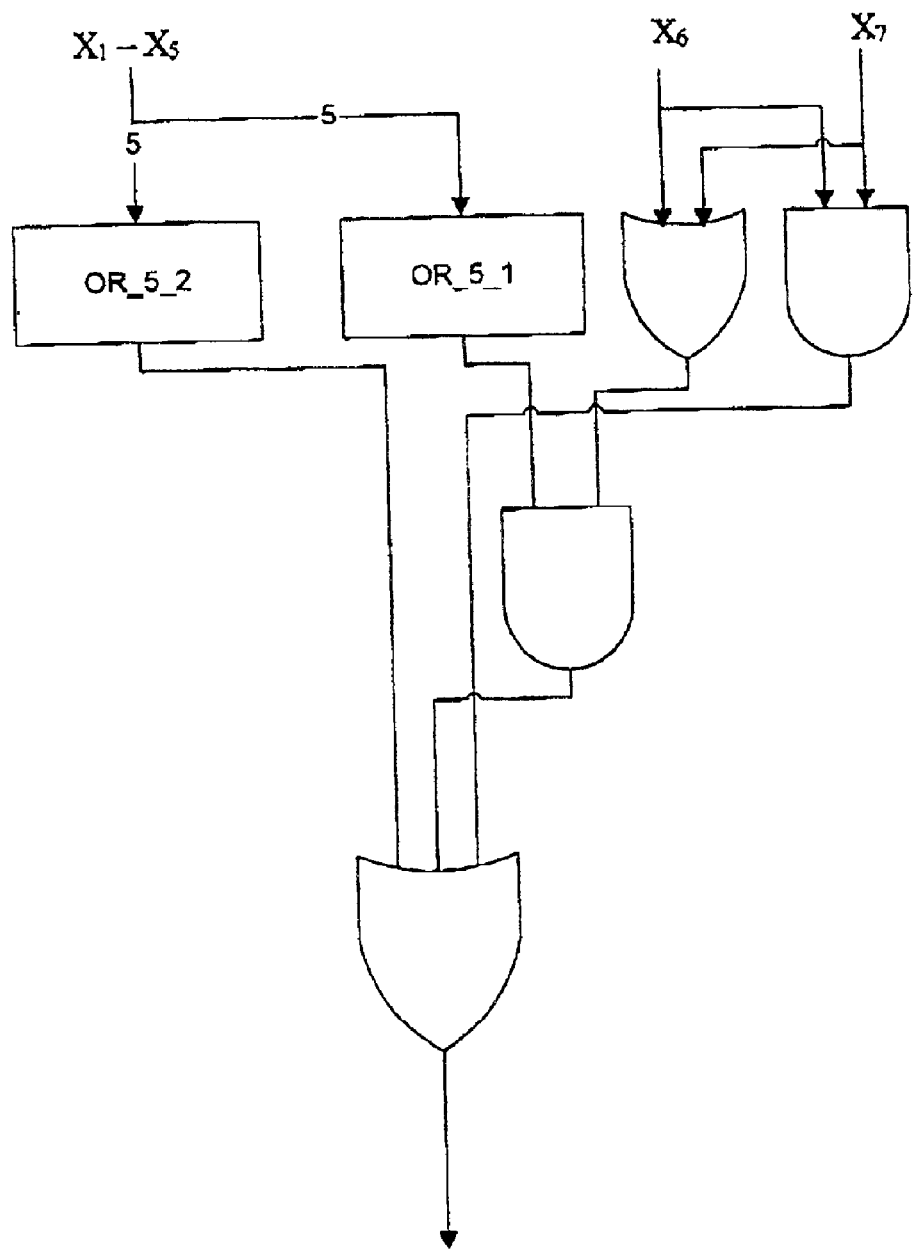
Figure 12:
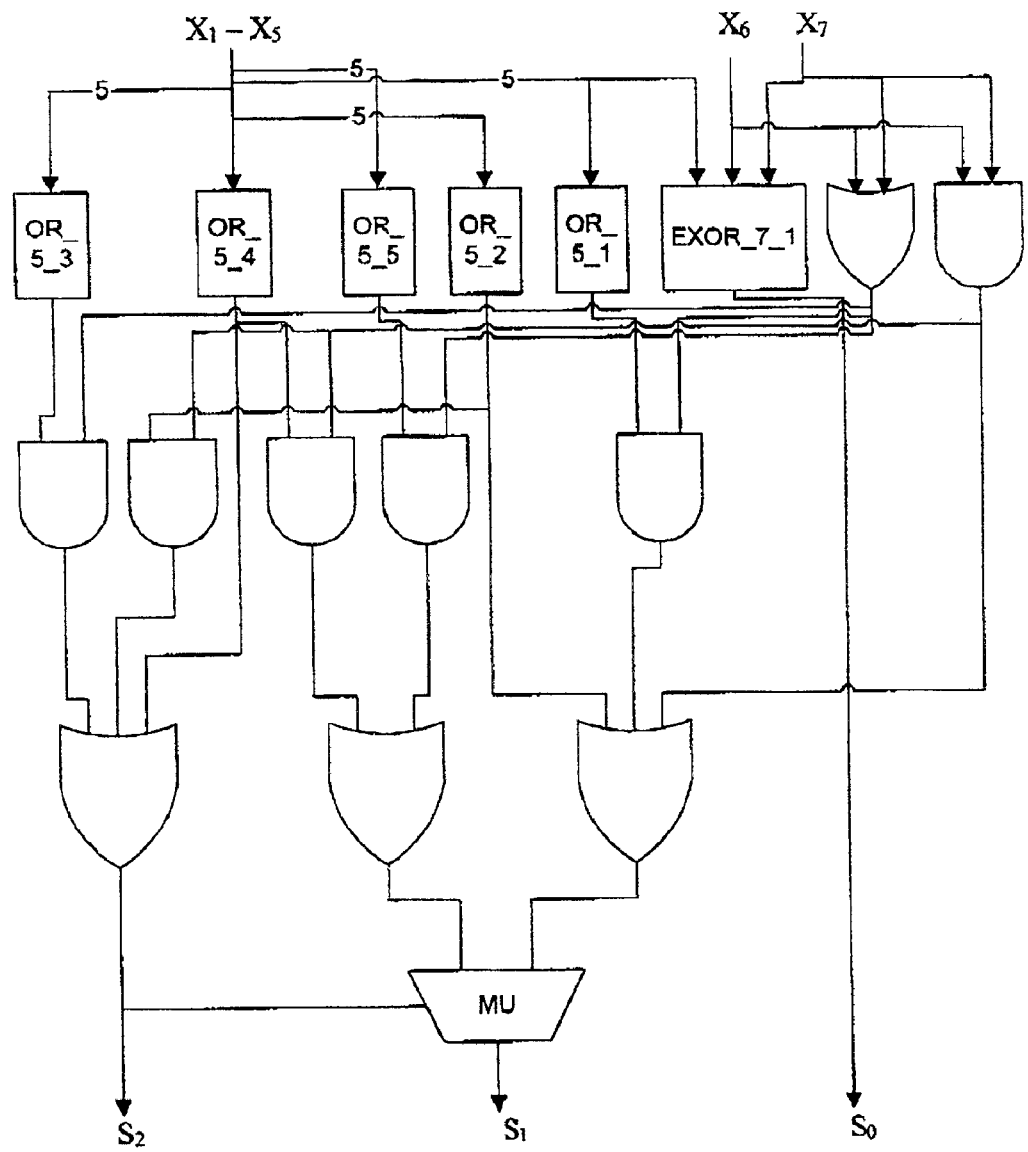

FIG. 10 is a diagram illustrating a parallel counter using the two types of symmetric functions and having seven inputs and three outputs according to one embodiment of the present invention, FIG. 11 is a diagram illustrating splitting of the symmetric function OR_7_2 into sub modules to allow the reusing of smaller logic blocks according to one embodiment of the present invention, FIG. 12 is a diagram of a parallel counter using the EXOR_7_1 symmetric function for the generation of the least significant output bit from all of the input bits, and smaller modules implementing symmetric functions using OR logic to generate the second and third output bits according to one embodiment of the present invention.

Figure 13:
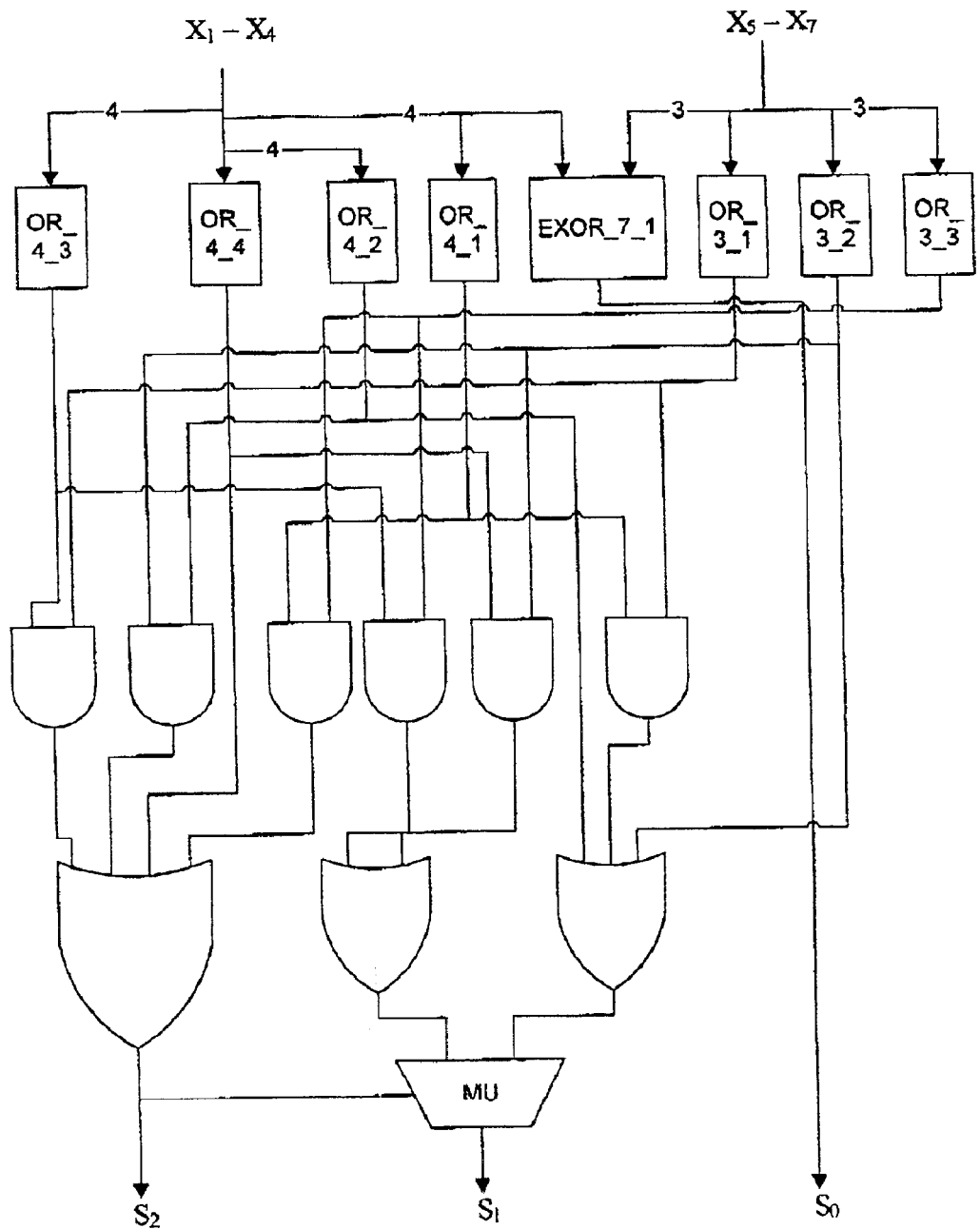
Figure 14:
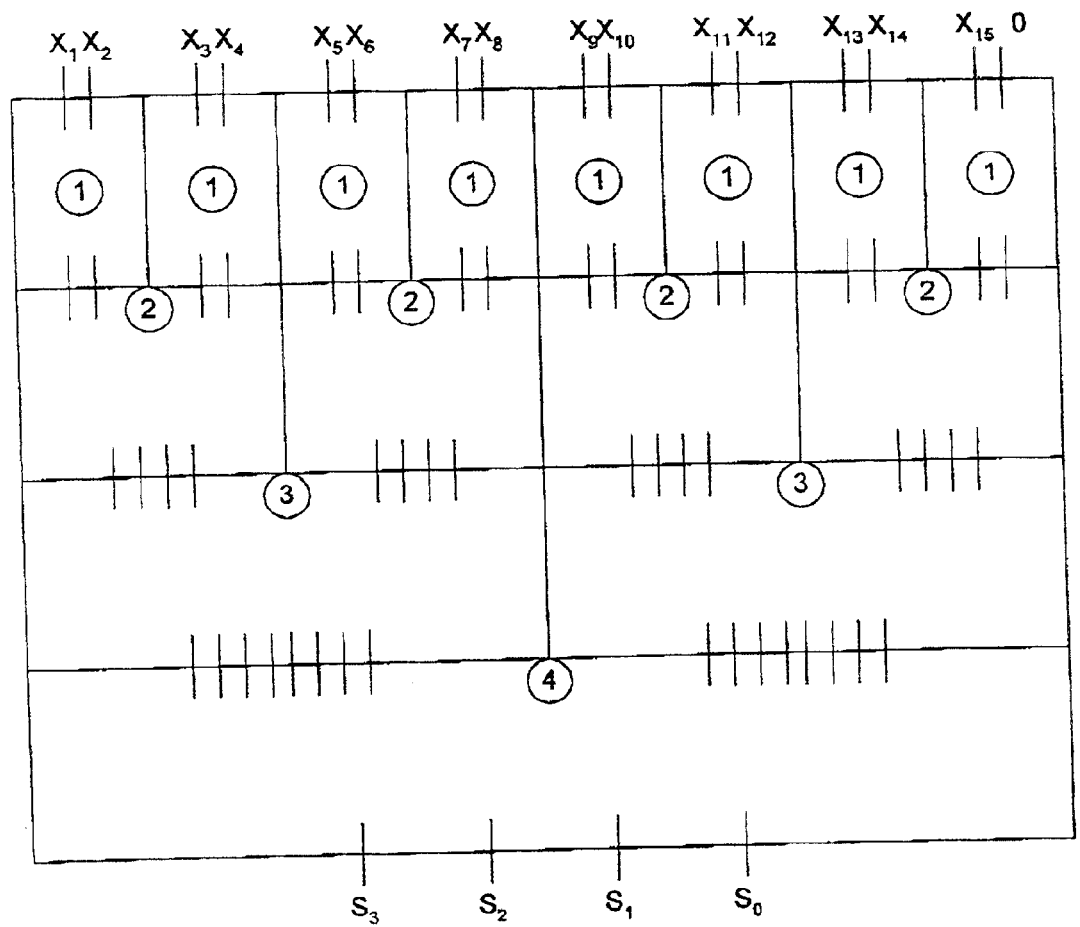
Figure 15:
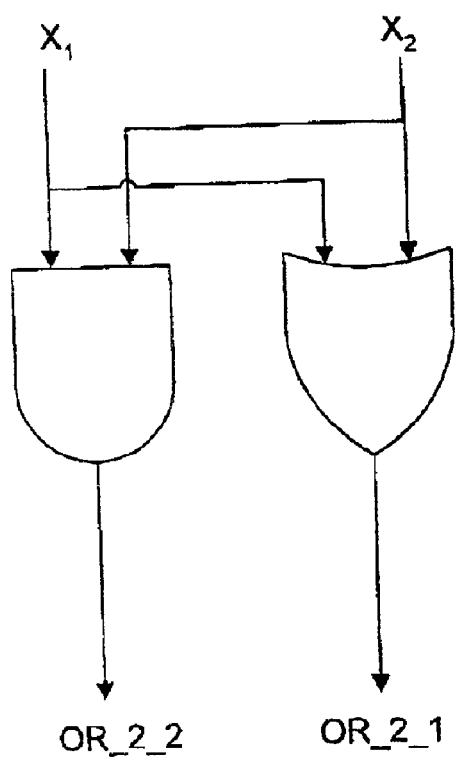
Figure 16:
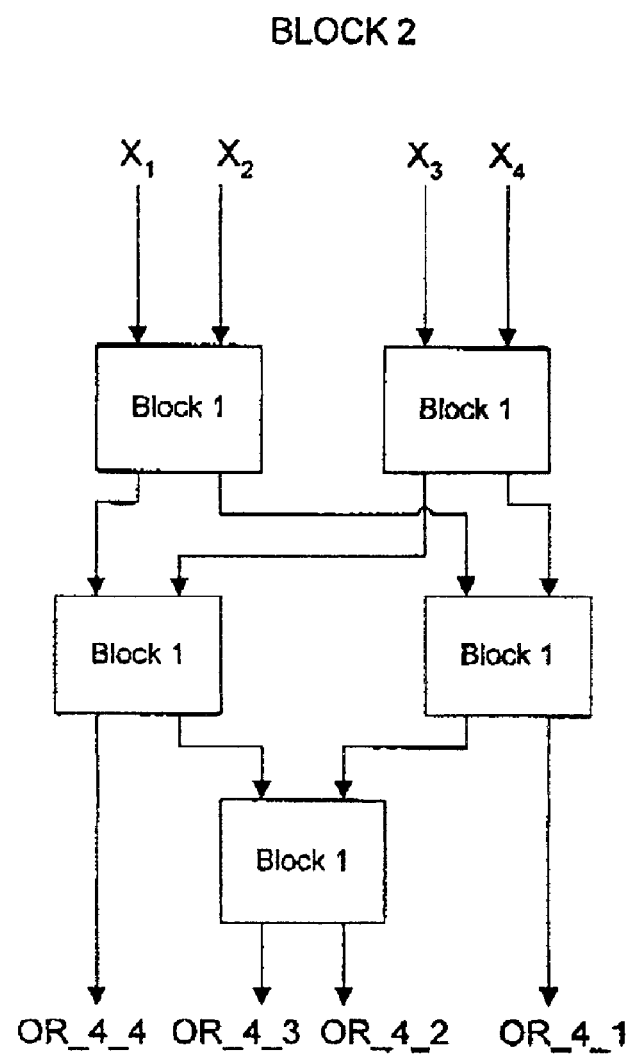
Figure 17:
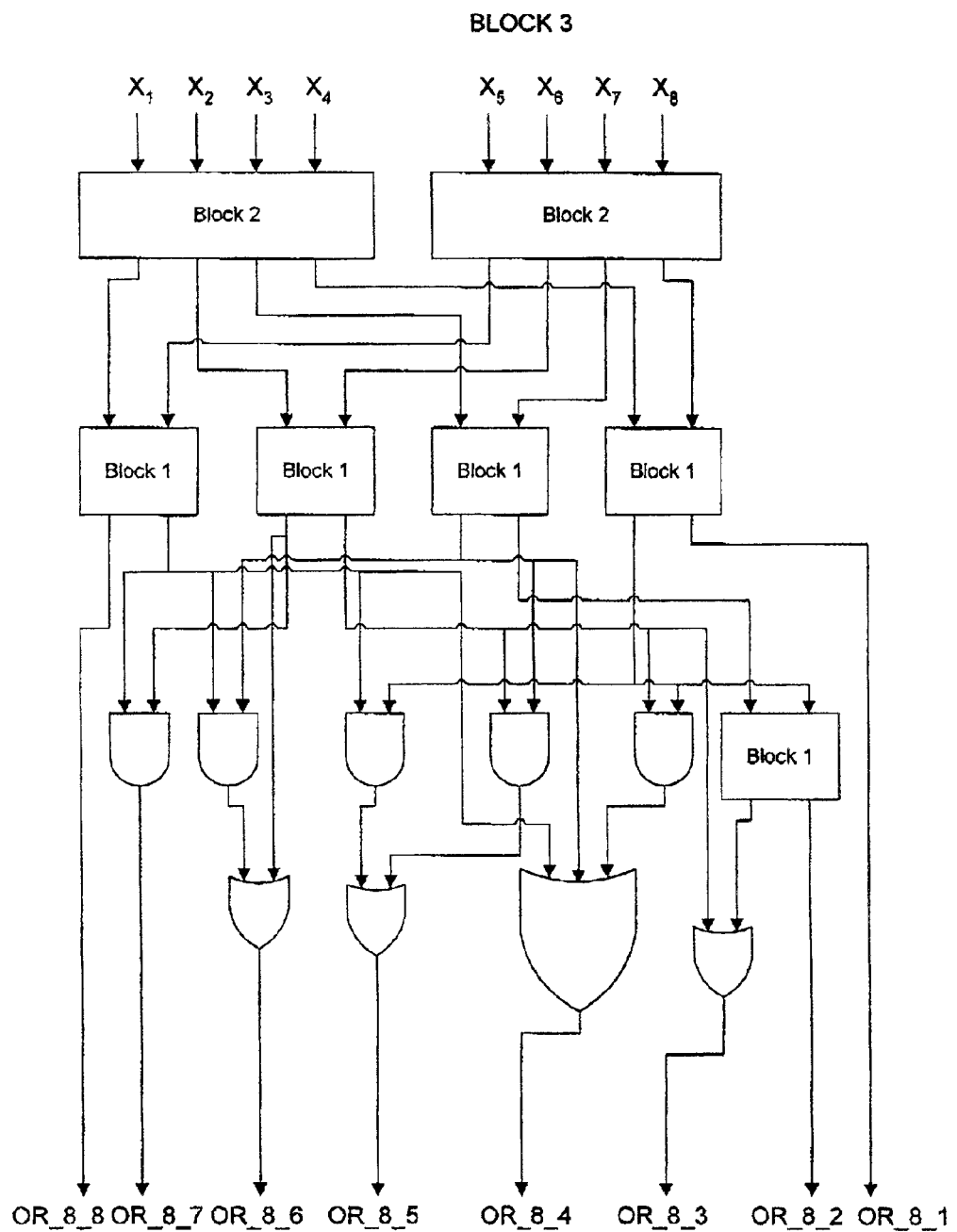
Figure 18:
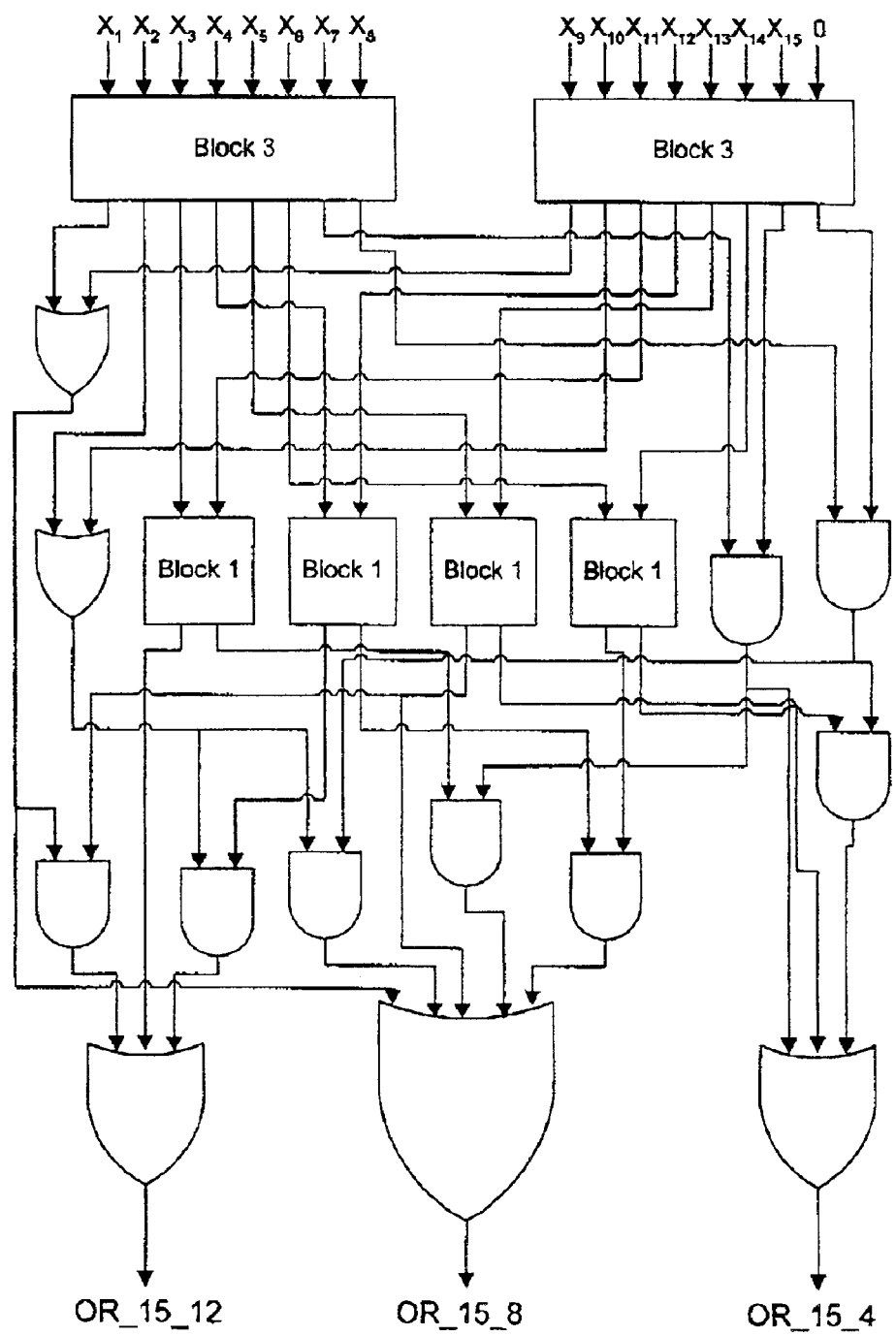
Figure 19:
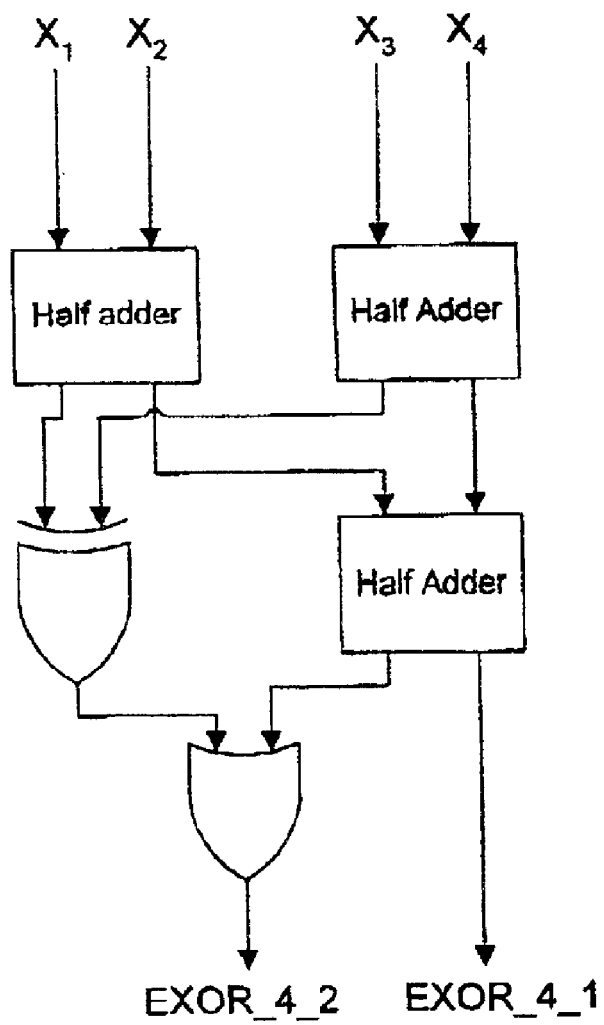
Figure 20:
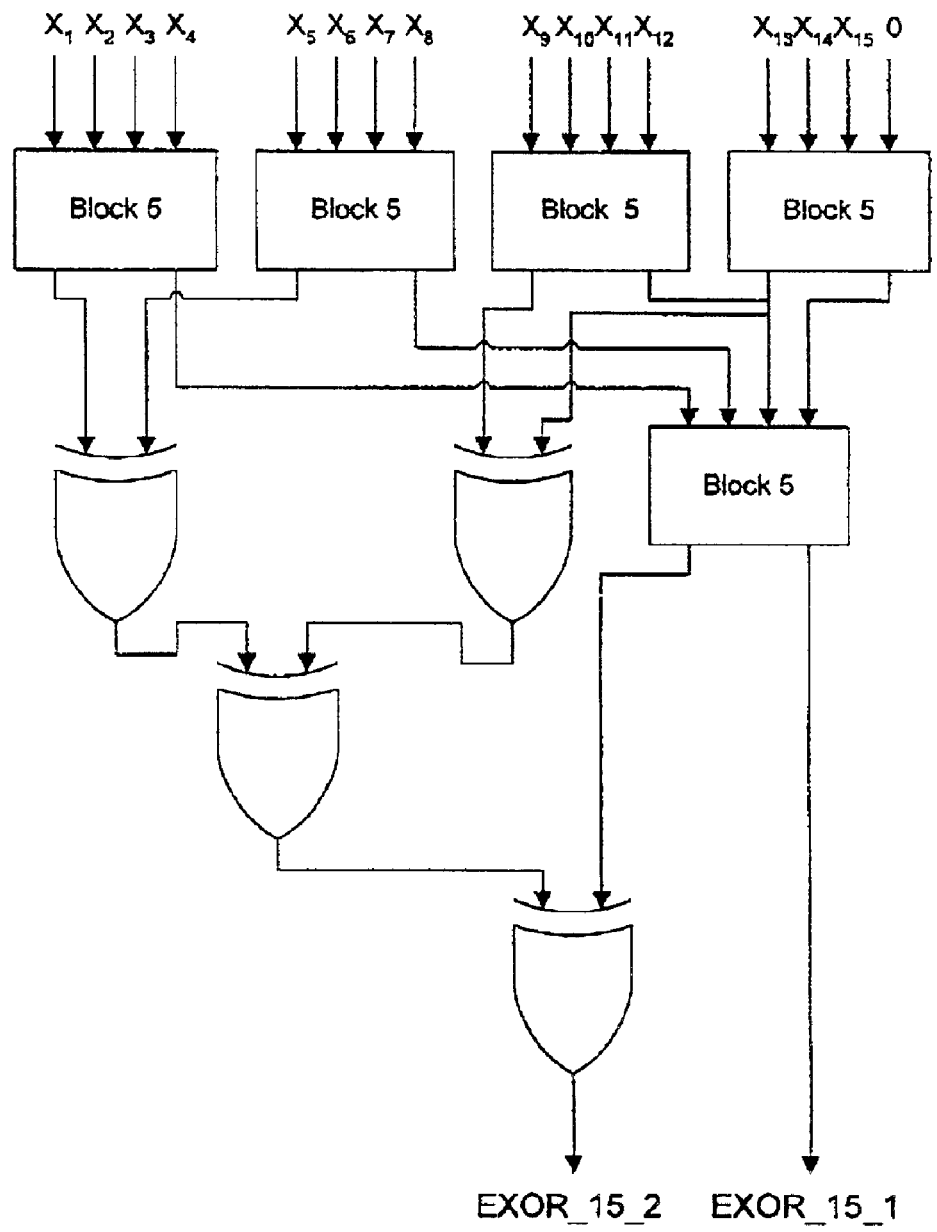
Figure 21:
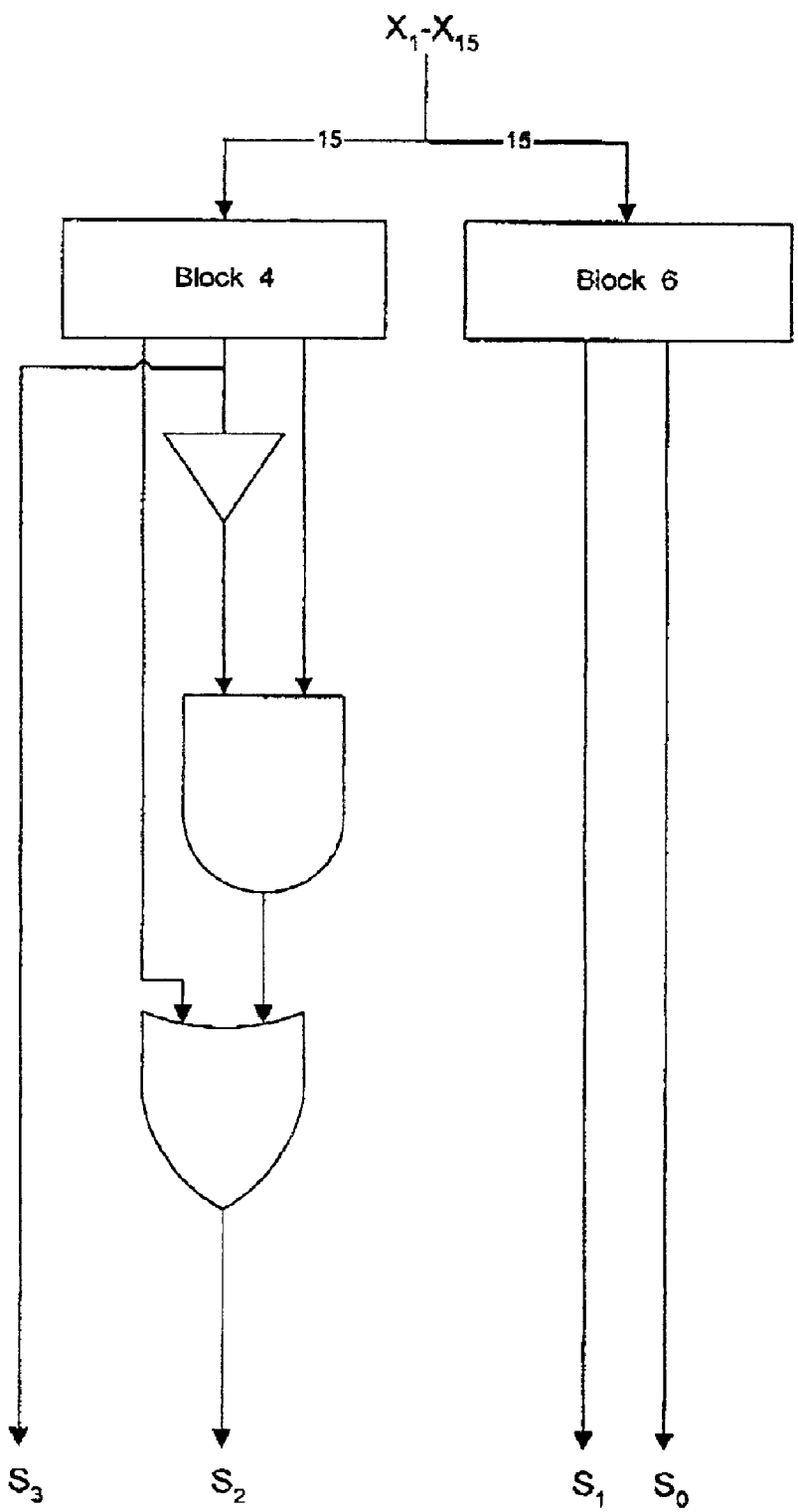
Figure 24:
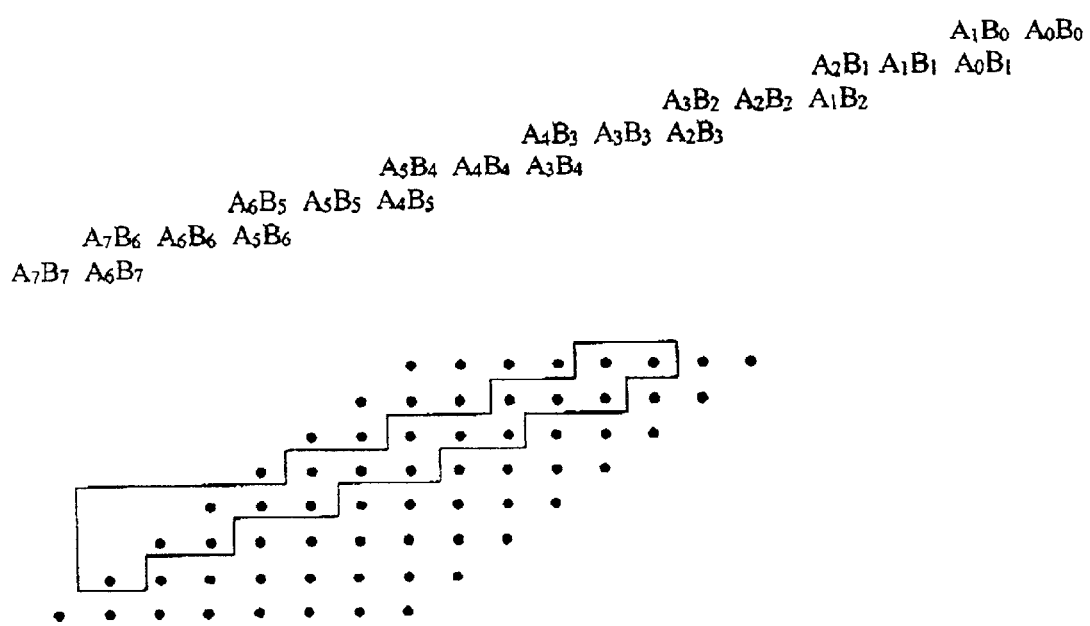
Figure 25:
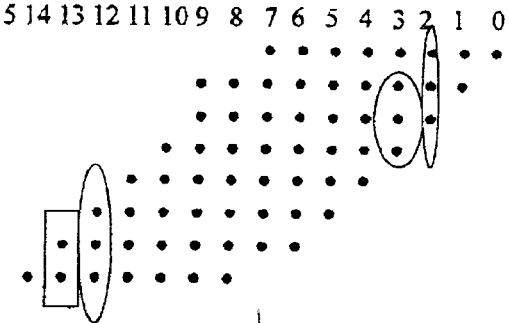
Figure 26:
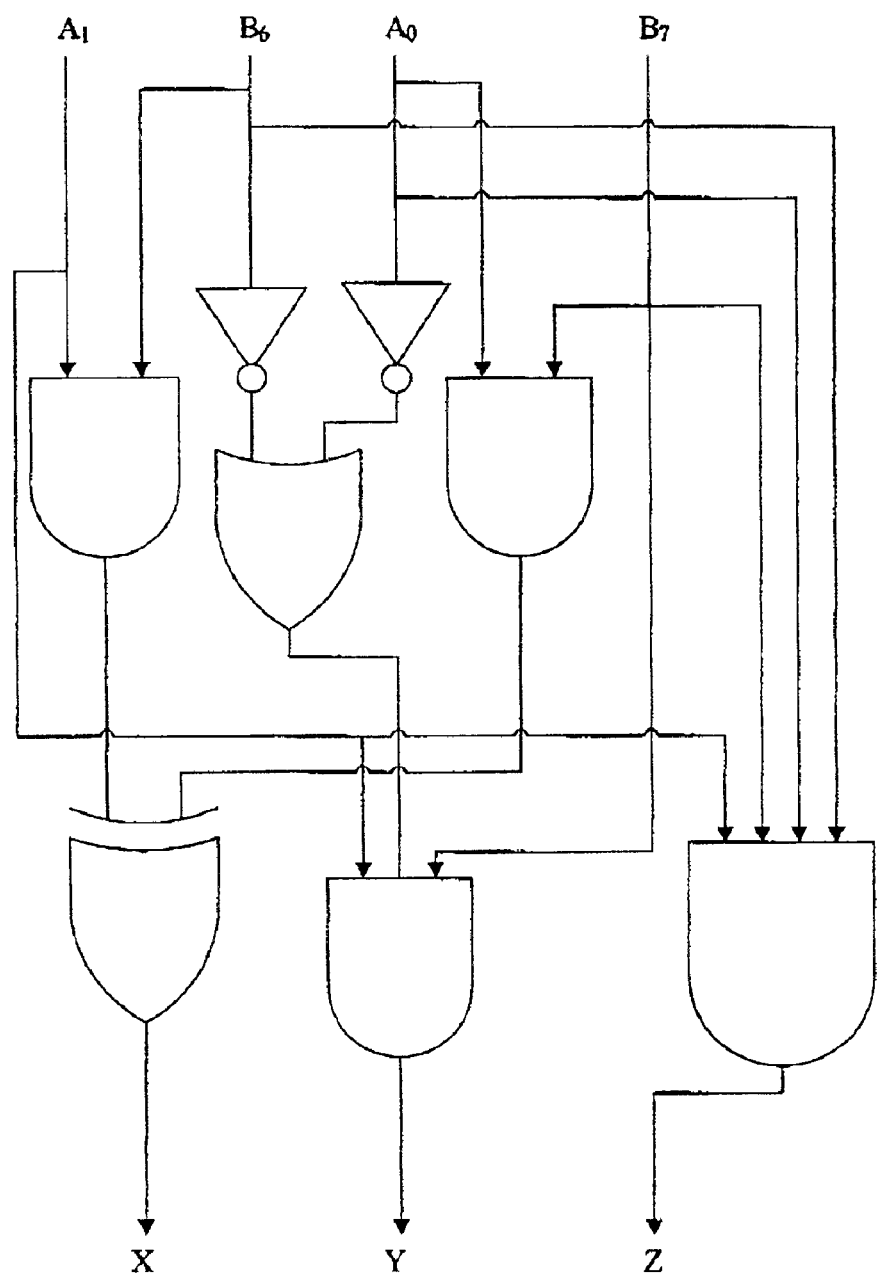

FIG. 13 is a another diagram of a parallel counter similar to that of FIG. 12 accept that the partitioning of the inputs is chosen differently to use different functional sub modules according to one embodiment of the present invention, FIG. 14 is a diagram schematically illustrating the binary tree organisation of the logic in a parallel counter according to a second aspect of the invention, FIG. 15 is a diagram illustrating the logic block (Block 1) for implementing the elementary symmetric functions OR_2_2 and OR_2_1 according to one embodiment of the present invention, FIG. 16 is a diagram illustrating the logic block (Block 2) for implementing the secondary symmetric functions OR_4_4, OR_4_3, OR_4_2 and OR_4_1 according to one embodiment of the present invention, FIG. 17 is a diagram illustrating the logic block (Block 3) for implementing the tertiary symmetric functions OR_8_8, OR_8_7, OR_8_6, OR_8_5, OR_8_4, OR_8_3, OR_8_2 and OR_8_1 according to one embodiment of the present invention, FIG. 18 is a diagram illustrating the logic block (Block 4) for implementing the symmetric functions OR_15_12, OR_15_8 and OR_15_4 according to one embodiment of the present invention, FIG. 19 is a diagram illustrating the logic block (Block 5) for implementing the elementary symmetric functions EXOR_4_2 and OR_4_1 according to one embodiment of the present invention, FIG. 20 is a diagram illustrating the logic block (Block 6) for implementing the elementary symmetric functions EXOR_15_2 and OR_15_1 according to one embodiment of the present invention, FIG. 21 is a diagram schematically illustrating a parallel counter using the logic blocks of FIGS. 15 to 20 according to one embodiment of the present invention, FIG. 22 is a diagram of the steps used in the prior art for multiplication, FIG. 23 is a schematic diagram of the process of FIG. 22 in more detail, FIG. 24 is a diagram illustrating the properties of diagonal regions in the array, FIG. 25 is a diagram illustrating array deformation in accordance with the embodiment of the present invention and the subsequent steps of array reduction and adding, and FIG. 26 is a diagram of logic used in this embodiment for array generation.

The first aspect of the present invention will now be described.

The first aspect of the present invention relates to a parallel counter counting the number of high values in a binary number. The counter has i outputs and n inputs where i is determined as being the integer part of $\log_2 n$ plus 1

A mathematical basis for the first aspect of the present invention is a theory of symmetric functions. We denote by $C^n_k$ the number of distinct k element subsets of a set of n elements. We consider two functions EXOR_n_k and OR_n_k of n variables $X_1, X_2, \ldots X_n$ given by $$EXOR\_n\_k(X_1, X_2, \ldots X_n) = \oplus (X_{i1} \wedge X_{i2} \wedge \ldots \wedge X_{ik}),$$

$$OR\_n\_k(X_1, X_2, \ldots X_n) = \vee (X_{i1} \wedge X_{i2} \wedge \ldots \wedge X_{ik})$$

where (i1, i2, ... ik) runs over all possible subsets of $\{X_1, X_2, \ldots X_n\}$ that contain precisely k elements. Blocks that produce such outputs are shown on FIG. 3.

The functions EXOR_n_k and OR_n_k are elementary symmetric functions. Their values depend only on the number of high inputs among $X_1, X_2, X_3, \ldots X_n$. More precisely, if m is the number of high inputs among $X_1, X_2, X_3, \ldots X_n$ then OR_n_k($X_1, X_2, \ldots X_n$) is high if and only if $m \geq k$. Similarly, EXOR_n_k($X_1, X_2, \ldots X_n$) is high if and only if $m \geq k$ and $C^m_k$ is odd.

Although EXOR_n_k and OR_n_k look similar, OR_n_k is much faster to produce since EXOR-gates are slower than OR-gates.

In the above representation n is the number of inputs and k is the size of the subset of inputs selected. Each set of k inputs is a unique set and the subsets comprise all possible subsets of the set of inputs. For example, the symmetric function OR_3_1 has three inputs $X_1$, $X_2$ and $X_3$ and the set size is 1. Thus the sets comprise $X_1$, $X_2$ and $X_3$. Each of these sets is then logically OR combined to generated the binary output. The logic for performing this function is illustrated in FIG. 4.

FIG. 5 illustrates the logic for performing the symmetric OR_4_1.

When the number of inputs become large, it may not be possible to use simple logic.

FIG. 6 illustrates the use of two OR gates for implementing the symmetric function OR_5_1.

FIG. 7 similarly illustrates the logic for performing EXOR_7_1. The sets comprise the inputs $X_1$, $X_2$, $X_3$, $X_4$, $X_5$, $X_6$, and $X_7$. These inputs are input into three levels of exclusive OR gates.

When k is greater than 1, the inputs in a subset must be logically AND combined. FIG. 8 illustrates logic for performing the symmetric function OR_3_2. The inputs $X_1$ and $X_2$ comprise the first set and are input to a first AND gate. The inputs $X_1$ and $X_3$ constitute a second set and are input to a second AND gate. The inputs $X_2$ and $X_3$ constitute a third set and are input to a third AND gate. The output of the AND gates are input to an OR gate to generate the output function.

FIG. 9 is a diagram illustrating the logic for performing the symmetric function EXOR_5_3. To perform this function the subsets of size 3 for the set of five inputs comprise ten sets and ten AND gates are required. The output of the AND gates are input to an exclusive OR gate to generate the function.

The specific logic to implement the symmetric functions will be technology dependent. Thus the logic can be designed in accordance with the technology to be used.

In accordance with a first embodiment of the present invention the parallel counter of each output is generated using a symmetric function using exclusive OR logic.

Let the parallel counter have n inputs $X_1, \ldots X_n$ and t+1 outputs $S_t, S_{t-1}, \ldots S_0$. $S_0$ is the least significant bit and $S_t$ is the most significant bit For all i from 0 to t, $$S_i = EXOR\_n\_2^i(X_1, X_2, \ldots X_n).$$

It can thus be seen that for a seven bit input i.e. n=7, i will have values of 0, 1 and 2. Thus to generate the output $S_0$ the function will be EXOR_7_1, to generate the output $S_1$ the function will be EXOR_7_2 and to generate the output $S_2$ the function will be EXOR_7_4. Thus for the least significant bit the set size (k) is 1, for the second bit the set size is 2 and for the most significant bit the set size is 4. Clearly the logic required for the more significant bits becomes more complex and thus slower to implement.

Thus in accordance with a second embodiment of the present invention, the most significant output bit is generated using a symmetric function using OR logic.

This is more practical since OR_n_k functions are faster than EXOR_n_k functions. For the most significant output bit $$S_k = OR\_n\_2^t(X_1, X_2, \ldots X_n).$$

In particular, with a seven-bit input $$S_2 = OR\_7\_4(X_1, X_2, X_3, X_4, X_5, X_6, X_7).$$

Thus in this second embodiment of the present invention the most significant bit is generated using symmetric functions using OR logic whereas the other bits are generated using symmetric functions which use exclusive OR logic.

A third embodiment will now be described in which intermediate bits are generated using symmetric functions using OR logic.

An arbitrary output bit can be expressed using OR_n_k functions if one knows bits that are more significant. For instance, the second most significant bit is given by $$S_{t-1} = (S_t \wedge OR\_n\_2^t + 2^{t-1}) \vee ((\neg S_t) \wedge OR\_n\_2^{t-1}).$$

In particular, with a seven-bit input $$S_1 = (S_2 \wedge OR\_7\_6(X_1, X_2, X_3, X_4, X_5, X_6, X_7)) \vee ((\neg S_2) \wedge OR\_7\_2(X_1, X_2, X_3, X_4, X_5, X_6, X_7)).$$

A further reduction is $$S_1 = OR\_7\_6(X_1, X_2, X_3, X_4, X_5, X_6, X_7) \vee ((\neg S_2) \wedge OR\_7\_2(X_1, X_2, X_3, X_4, X_5, X_6, X_7)).$$

A multiplexer MU, shown in FIG. 3, implements this logic. It has two inputs $X_0$, $X_1$, a control C, and an output Z determined by the formula $$Z = (C \wedge X_1) \vee ((\neg C) \wedge X_0).$$

It is not practical to use either EXOR_n_k functions or OR_n_k functions exclusively. It is optimal to use OR_n_k functions for a few most significant bits and EXOR_n_k functions for the remaining bits. The fastest, in TSMC.25, parallel counter with 7 inputs is shown in FIG. 10.

Future technologies that have fast OR_15_8 blocks would allow building a parallel counter with 15 inputs. A formula for the third significant bit using OR_n_m functions is thus:

$$S_{t-2} = (S_t \wedge S_{t-1} \wedge OR\_n\_2^t + 2^{t-2}$$

$$2^{t-2}) \vee (S_t$$

$$\wedge (\neg S_{t-1}) \wedge OR\_n\_2^t + 2^{t-2}) \vee$$

$$((\neg S_t) \wedge S_{t-1} \wedge OR\_n_{13}\ 2^{t-1} + 2^{2-2}) \vee$$

$$((\neg S_t) \wedge (\neg S_{t-1}) \wedge OR\_n\_2^{t-2}).$$

A fourth embodiment of the present invention will now be described which divides the logic block implementing the symmetric function into small blocks which can be reused.

An implementation of OR_7_2 is shown in FIG. 11. The 7 inputs are split into two groups: five inputs from $X_1$ to $X_5$ and two remaining inputs $X_6$ and $X_7$. Then the following identity is a basis for the implementation in FIG. 11.

$$OR\_7\_2(X_1, \ldots, X_7) = OR\_5\_2(X_1, \ldots,$$

$$X_5) \vee$$

$$(OR\_5\_1(X_1, \ldots X_5) \wedge OR\_2\_1(X_6, X_7)) \vee$$

$$OR\_2\_2(X_6, X_7)$$

One can write similar formulas for OR_7_4 and OR_7_6. Indeed, $$OR\_7\_4(X_1, \ldots, X_7) = OR\_5\_4(X_1, \ldots,$$

$$X_5) \vee$$

$$(OR\_5\_3(X_1, \ldots X_5) \wedge OR\_2\_1(X_6, X_7)) \vee$$

$$(OR\_5\_2(X_1, \ldots, X_5) \wedge OR\_2\_2(X_6, X_7)),$$

$$OR\_7\_6(X_1, \ldots, X_7) =$$

$$(OR\_5\_5(X_1, \ldots X_5) \wedge OR\_2\_1(X_6, X_7)) \vee$$

$$(OR\_5\_4(X_1, \ldots X_5) \wedge OR\_2\_2(X_6, X_7)).$$

Thus, it is advantageous to split variables and reuse smaller OR_n_k functions in a parallel counter. For instances an implementation of a parallel counter based on partitioning seven inputs into groups of two and five is in FIG. 12

Similarly, one can partition seven inputs into groups of four and three. An implementation of the parallel counter based on this partition is in FIG. 13. One uses the following logic formulas in this implementation.

$$OR\_7\_2(X_1, \ldots, X_7) = OR\_4\_2(X_1, X_2, X_3,$$

$$X_4) \vee$$

$$(OR\_4\_1(X_1, X_2, X_3, X_4) \wedge OR\_3\_1$$

$$(X_5, X_6, X_7)) \vee OR\_3\_2(X_5, X_6, X_7),$$

$$OR\_7\_4(X_1, \ldots, X_7) = OR\_4\_4(X_1, X_2, X_3,$$

$$X_4) \vee$$

$$(OR\_4\_3(X_1, X_2, X_3, X_4) \wedge OR\_3\_1$$

$$(X_5, X_6, X_7)) \vee$$

$$(OR\_4\_2(X_1, X_2, X_3, X_4) \wedge OR\_3\_2$$

$$(X_5, X_6, X_7)) \vee$$

$$(OR\_4\_1(X_1, X_2, X_3, X_4) \wedge OR\_3\_3$$

$$(X_5, X_6, X_7)),$$

$$OR\_7\_6(X_1, \ldots, X_7) =$$

$$(OR\_4\_4(X_1, X_2, X_3, X_4) \wedge OR\_3\_2$$

$$(X_5, X_6, X_7)) \vee$$

$$(OR\_4\_3(X_1, X_2, X_3, X_4) \wedge OR\_3\_3$$

$$(X_5, X_6, X_7)).$$

One needs a method to choose between the implementations in FIGS. 12 and 13. Here is a pneumonic rule for making a choice. If one or two inputs arrive essentially later then one should use the implementation on FIG. 12 based on partition 7=5+2. Otherwise, the implementation on FIG. 13 based on partition 7=4+3 is probably optimal.

Parallel counters with 6, 5, and 4 inputs can be implemented according to the logic for the seven input parallel counter. Reducing the number of inputs decreases the area significantly and increases the speed slightly. It is advantageous to implement a six input parallel counter using partitions of 6, 3+3 or 4+2.

A preferred embodiment of the present invention will now be described with reference to FIGS. 14 to 21.

Although it is possible to implement any OR_n_k or EXOR_n_k function in two levels of logic, the fan-out of each input is very high and the fan-in of the OR gate is also very high. It is known that both high fan-out and high fan-in contribute significantly to the delay of the circuit. It is often required that more than one OR_n_k or EXOR_n_k function be computed from the same inputs. A two level implementation does not allow sharing of logic thus resulting in high area.

This embodiment of the present invention uses the binary tree splitting of the inputs and the logic to reduce fan-out and enable reuse of logic. FIG. 14 illustrates schematically the organisation of the logic, At a first level 8 elementary logic blocks 1 are used each having two of the binary inputs and providing 2 outputs. The elementary logic blocks 1 of the first level perform elementary symmetric functions. These can either be exclusive OR symmetric functions or OR symmetric functions. At the second level four secondary logic blocks 2 each use the logic of two elementary logic blocks 1 and hence have four inputs and four outputs. The secondary logic blocks 2 perform larger symmetric functions. At the third level two tertiary logic blocks 3 each use the logic of two secondary logic blocks 2 and hence have eight inputs and eight outputs. The tertiary logic blocks 3 perform larger symmetric functions. At the fourth level the parallel counter 4 uses the logic of two tertiary logic blocks 3 and hence has sixteen inputs and sixteen outputs.

As can be seen in FIG. 14, the binary tree arrangement of the logic enables the logic for performing smaller symmetric functions to be used for the parallel counter. Also the arrangement provides for significant logic sharing. This significantly reduces fan-out.

As will be described in more detail, it is also possible to provide further logic sharing by using the elementary symmetric function logic for combining outputs of previous logic blocks in the binary tree.

The functions OR_16_8, OR_16_4 and OR_16_12 are constructed from the set of inputs $X_1, X_2 \ldots X_{16}$. Although, the embodiment is described with OR_n_k functions the same construction applies to EXOR_n_k functions after replacing every OR gate by an EXOR gate.

The principles behind this embodiment of the invention will now be described. The function OR_(r+s)_t can be computed as the OR of the functions OR_r_k ^ OR_s_t-k as t runs through 0, 1, 2 . . . k, $$OR\_(r{+}s)\_t(X_1 \ldots X_{r+s}) = \vee_{k=0}^{t}[OR\_r\_k(X_1 \ldots X_r)\hat{\,}OR\_s\_(t{-}k)(X_{r+1} \ldots X_{r+s})].$$

In an embodiment with 16 inputs at a first level the 16 inputs are divided into 8 subsets – $\{X_1,X_2\}, \{X_3,X_4\}, \ldots, \{X_{15},X_{16}\}$, each subset containing two inputs. For each subset a logic block 1 that computes OR_2_1 and OR_2_2 is constructed. The 8 blocks form the first level of the tree. Since each input fans out into an OR gate and an AND gate we see that each input has a fan-out of two. Also the first layer is very regular consisting of 8 identical blocks. The logic block 1 for computing the symmetric functions OR_2_1 and OR_2_2 is illustrated in FIG. 15.

At a second level, 4 logic blocks 2 are formed by combining outputs from two adjacent logic blocks 1 at level one. These 4 blocks comprise the second layer of the tree. Each block has as inputs the outputs of two adjacent blocks from level one. The inputs are combined to form the functions OR_4_1, OR_4_2, OR_4_3, OR_4_4. The logic block 2 for computing these symmetric functions is illustrated in FIG. 16. The indices 1 and 2 are used in the equations below to distinguish functions formed on different subsets of the set of inputs. The symmetric functions can be represented as:

$OR\_4\_1 = [OR\_2\_1]_1 \vee [OR\_2\_1]_2,$ $OR\_4\_2 = ([OR\_2\_1]_1 \hat{\,} [OR\_2\_1]_2) \vee ([OR\_2\_2]_1 + [OR\_2\_2]_2),$ $OR\_4\_3 = ([OR\_2\_1]_1 \hat{\,} [OR\_2\_2]_2) \vee ([OR\_2\_2]_1 \hat{\,} [OR\_2\_1]_2),$ $OR\_4\_4 = [OR\_2\_2]_1 \hat{\,} [OR\_2\_2]_2.$ At a third level, 2 logic blocks 3 are formed by combining outputs from two adjacent logic blocks 2 at level two. These 2 blocks comprise the third layer of the tree. Each block has as inputs the outputs of two adjacent blocks from level two. The inputs are combined to form the functions OR_8_1, OR_8_2, OR_8_3, OR_8_4, OR_8_5, OR_8_6, OR_8_7 and OR_8_8. The logic block 3 for computing these symmetric functions is illustrated in FIG. 17. The symmetric functions can be represented as:

$OR\_8\_1 = [OR\_4\_1]_1 \vee [OR\_4\_1]_2,$ $OR\_8\_2 = ([OR\_4\_1]_1 \hat{\,} [OR\_4\_1]_2) \vee [OR\_4\_2]_1 \vee [OR\_4\_2]_2,$ $OR\_8\_3 = ([OR\_4\_1]_1 \hat{\,} [OR\_4\_2]_2) \vee ([OR\_4\_2]_1 \hat{\,} [OR\_4\_1]_2) \vee [OR\_4\_3]_1 \vee [OR\_4\_3]_2,$ $OR\_8\_4 = ([OR\_4\_1]_1 \hat{\,}$ $[OR\_4\_3]_2) \vee$ $([OR\_4\_2]_1 \hat{\,} [OR\_4\_2]_2) \vee$ $([OR\_4\_3]_1 \hat{\,} [OR\_4\_1]_2) \vee$ $[OR\_4\_4]_1 \vee [OR\_4\_4]_2,$ $OR\_8\_5 = ([OR\_4\_1]_1 \hat{\,}$ $[OR\_4\_4]_2) \vee$ $([OR\_4\_2]_1 \hat{\,} [OR\_4\_3]_2) \vee$ $([OR\_4\_3]_1 \hat{\,} [OR\_4\_2]_2) \vee$ $([OR\_4\_4]_1 \hat{\,} [OR\_4\_1]_2),$ $OR\_8\_6 = ([OR\_4\_2]_1 \hat{\,}$ $[OR\_4\_4]_2) \vee$ $([OR\_4\_3]_1{}^{\wedge}[OR\_4\_3]_2)v$ $([OR\_4\_4]_1{}^{\wedge}[OR\_4\_2]_2),$ $OR\_8\_7=([OR\_4\_3]_1{}^{\wedge}$ $[OR\_4\_4]_2)v$ $([OR\_4\_4]_1{}^{\wedge}[OR\_4\_3]_2),$ $OR\_8\_8=[OR\_4\_4]_1{}^{\wedge}[OR\_4\_4]_2.$ At the final level, 3 outputs are formed by combining outputs from the two adjacent logic blocks 3 at level 3. This logic comprises the third layer of the tree. Outputs of the two adjacent blocks from level three are combined to form the functions OR_6_8, OR_16_4, and OR_16_12. The logic block 4 for computing these symmetric functions is illustrated in FIG. 18. The symmetric functions can be represented as:

$OR\_16\_4=([OR\_8\_1]_1{}^{\wedge}$ $[OR\_8\_3]_2)v$ $([OR\_8\_2]_1{}^{\wedge}[OR\_8\_2]_2)v$ $([OR\_8\_3]_1{}^{\wedge}[OR\_8\_1]_2)v$ $[OR\_8\_4]_1v$ $[OR\_8\_4]_2,$ $OR\_16\_8=([OR\_8\_1]_1{}^{\wedge}$ $[OR\_8\_7]_2)v([OR\_8\_2]_1{}^{\wedge}$ $[OR\_8\_6]_2)v$ $([OR\_8\_3]_1{}^{\wedge}[OR\_8\_5]_2)v$ $([OR\_8\_4]_1{}^{\wedge}[OR\_8\_4]_2)v$ $([OR\_8\_5]_1{}^{\wedge}[OR\_8\_3]_2)v$ $([OR\_8\_6]_1{}^{\wedge}[OR\_8\_2]_2)v$ $([OR\_8\_7]_1{}^{\wedge}[OR\_8\_1]_2)v$ $[OR\_8\_8]_1v[OR\_8\_8]_2,$ $OR\_16\_12=([OR\_8\_4]_1{}^{\wedge}$ $[OR\_8\_8]_2)v([OR\_8\_5]_1{}^{\wedge}$ $[OR\_8\_7]_2)v$ $([OR\_8\_6]_1{}^{\wedge}[OR\_8\_6]_2)v$ $([OR\_8\_7]_1{}^{\wedge}[OR\_8\_5]_2)v$ $([OR\_8\_8]_1{}^{\wedge}[OR\_8\_4]_2).$ Whilst it is possible in accordance with the invention to generate all of the outputs of the parallel counter using the outputs of the logic blocks 3, it is advantageous to determine the two least significant bits separately in parallel. This is illustrated in FIGS. 19 and 20. Although this increases fan-out slightly, it decreases the depth of the tree thus increases the speed of the circuit.

FIG. 19 is a diagram of a logic block 5 for determining the symmetric functions EXOR_4_2 and EXOR_4_1. In the determination of EXOR_4_2 the faster OR gate replaces an EXOR gate, according to:

$EXOR\_4\_2=([OR\_2\_1]_1{}^{\wedge}$ $[OR\_2\_1]_2)\oplus[OR\_2\_2]_1\oplus[OR\_2\_2]_2=$ $=([OR\_2\_1]_1{}^{\wedge}[OR\_2\_1]_2)v$ $([OR\_2\_2]_1\oplus[OR\_2\_2]_2).$ Four of these logic blocks 5 are provided to take the 16 inputs. Thus the logic block 5 can be considered to be a combined level 1 and 2 implementation.

FIG. 20 is a diagram of a logic block 6 for determining the symmetric functions EXOR_15_2 and EXOR_15_1 which comprise the least two significant bits output from the parallel counter of this embodiment. This logic block comprises level 3 in the binary tree and it uses four of the logic blocks 5. Thus even in this parallel determination of the least significant two bits, there is reuse of logic using the binary tree structure.

FIG. 21 is a diagram of the parallel converter of this embodiment of the invention in which the logic of block 4 is used to determine the most significant bits and the logic of block 6 is used to determine the least significant bits.

In the logic blocks illustrated in FIGS. 16, 17 and 18, it can be seen that in addition to sharing logic for the inputs the outputs of the elementary logic blocks the secondary logic blocks and the tertiary logic blocks are input into elementary logic blocks thus providing further logic sharing. The reason for this is that OR functions are not independent. Assuming that $k \geq s$, $OR\_n\_k \wedge OR\_n\_s = OR\_n\_k,$ $OR\_n\_k v OR\_n\_s = OR\_n\_s.$ These formulas result in significant reductions in logic for parallel counter. The first instance of such a reduction is the following formula for the second most significant bit of a parallel counter, $S_{t-1}=OR\_n\_(2^t+2^{t-1})v[\neg OR\_n\_2^t \wedge$ $OR\_n\_2^{t-1}].$ To show the second instance of such a reduction, it is assumed that $k \geq s$, $([OR\_n\_k]_1 \wedge [OR\_m\_s]_2)v$ $([OR\_m\_s]_1 \wedge [OR\_n\_k]_2)=$ $[OR\_m\_s]_1 \wedge [OR\_m\_s]_2 \wedge$ $([OR\_n\_k]_1 v [OR\_n\_k]_2).$ These formulas allow the reduction of fan-out by sharing certain logic. As shown on block 2, the functions OR_4_2 and OR_4_3 are implemented by three levels of shared logic, $OR\_4\_1=[OR\_2\_1]_1 v [OR\_2\_1]_2,$ $OR\_4\_2=([OR\_2\_1]_1 \wedge [OR\_2\_1]_2)v$ $[OR\_2\_2]_1 v [OR\_2\_2]_2,$ $OR\_4\_3=[OR\_2\_1]_1 \wedge [OR\_2\_1]_2 \wedge$ $([OR\_2\_2]_1 v [OR\_2\_2]_2),$ $OR\_4\_4=[OR\_2\_2]_1{}^{\wedge}[OR\_2\_2]_2.$ Block 3 is a circuit implementing logic of level three. The reductions afford the following expressions for functions OR_8_1, OR_8_2, OR_8_3, OR_8_4, OR_8_5, OR_8_6, OR_8_7, and OR_8_8, $$OR\_8\_1 = [OR\_4\_1]_1 \vee [OR\_4\_1]_2,$$

$$OR\_8\_2 = ([OR\_4\_1]_1 \char`\^$$
$$[OR\_4\_1]_2) \vee$$
$$([OR\_4\_2]_1 \vee [OR\_4\_2]_2),$$

$$OR\_8\_3 = [([OR\_4\_1]_1 \char`\^$$
$$[OR\_4\_1]_2) \char`\^$$
$$([OR\_4\_2]_1 \vee [OR\_4\_2]_2) \vee$$
$$[OR\_4\_3]_1 \vee [OR\_4\_3]_2,$$

$$OR\_8\_4 = [([OR\_4\_1]_1 \char`\^$$
$$[OR\_4\_1]_2) \char`\^ ([OR\_4\_3]_1 \vee$$
$$[OR\_4\_3]_2)] \vee$$
$$([OR\_4\_2]_1 \char`\^ [OR\_4\_2]_2) \vee$$
$$[OR\_4\_4]_1 \vee [OR\_4\_4]_2,$$

$$OR\_8\_5 = [([OR\_4\_1]_1 \char`\^$$
$$[OR\_4\_1]_2) \char`\^$$
$$([OR\_4\_4]_1 \vee [OR\_4\_4]_2)] \vee$$
$$[([OR\_4\_2]_1 \char`\^ [OR\_4\_2]_2) \char`\^$$
$$([OR\_4\_3]_1 \vee [OR\_4\_3]_2)],$$

$$OR\_8\_6 = [([OR\_4\_2]_1 \char`\^$$
$$[OR\_4\_2]_2) \char`\^$$
$$([OR\_4\_4]_1 \vee [OR\_4\_4]_2)] \vee$$
$$([OR\_4\_3]_1 \char`\^ [OR\_4\_3]_2),$$

$$OR\_8\_7 = ([OR\_4\_3]_1 \char`\^$$
$$[OR\_4\_3]_2) \char`\^$$
$$([OR\_4\_4]_1 \vee [OR\_4\_4]_2),$$

$$OR\_8\_8 = [OR\_4\_4]_1 \char`\^ [OR\_4\_4]_2.$$

Block 4 is a circuit implementing logic for level 4. The implementation of functions OR_16_8, OR_16_4, and OR_16_12 follows reduced formulas, $$OR\_16\_4 = [([OR\_8\_1]_1 \char`\^$$
$$[OR\_8\_1]_2) \char`\^$$
$$([OR\_8\_3]_1 \vee [OR\_8\_3]_2)] \vee$$
$$([OR\_8\_2]_1 \char`\^ [OR\_8\_2]_2) \vee$$
$$[OR\_8\_4]_1 \vee [OR\_8\_4]_2,$$

$$OR\_16\_8 = [([OR\_8\_1]_1 \char`\^$$
$$[OR\_8\_1]_2) \char`\^$$
$$([OR\_8\_7]_1 \vee [OR\_8\_7]_2)] \vee$$
$$[([OR\_8\_2]_1 \char`\^ [OR\_8\_2]_2) \char`\^$$
$$([OR\_8\_6]_1 \vee [OR\_8\_6]_2)] \vee$$
$$[([OR\_8\_3]_1 \char`\^ [OR\_8\_3]_2) \char`\^$$
$$([OR\_8\_5]_1 \vee [OR\_8\_5]_2)] \vee$$
$$([OR\_8\_4]_1 \char`\^ [OR\_8\_4]_2) \vee$$
$$[OR\_8\_8]_1 \vee [OR\_8\_8]_2,$$

$$OR\_16\_12 = [([OR\_8\_4]_1 \char`\^$$
$$[OR\_8\_4]_2) \char`\^ ([OR\_8\_8]_1 \vee$$
$$[OR\_8\_8]_2)] \vee$$
$$([OR\_8\_6]_1 \char`\^ [OR\_8\_6]_2) \vee$$
$$[([OR\_8\_5]_1 \char`\^$$
$$[OR\_8\_5]_2) \char`\^ ([OR\_8\_7]_1 \vee$$
$$[OR\_8\_7]_2)].$$

The binary tree principle of this embodiment of the present invention can be implemented using either OR or EXOR symmetric functions. When using EXOR symmetric functions there is a reduction in logic which applies. Assume that $k = \Sigma_{i \in S} 2^i$ where S is a set of natural numbers uniquely determined by k as a set of positions of ones in the binary representation of k. Then $$EXOR\_n\_k = AND_{i \in S} EXOR\_n\_2^i.$$

Thus, designing a circuit computing EXOR_n_k, one gets away with computing only functions $EXOR\_n\_2^i$ on subsets and thus although EXOR logic is slower, there is less fan-out than when using OR logic.

As can be seen in FIG. 21 the most efficient circuit can comprise a mixture of OR and EXOR symmetric function logic circuits.

During the design of the parallel counter there is also a flier possibility to save logic. There is a useful formula, $$OR\_n\_k(X_1 \ldots X_n) = \neg OR\_n\_(n+1-k)(\neg X_1 \ldots \neg X_n).$$

Thus if a library contains a fast module generating OR_4_3 then this module can be used with inverters to generate OR_4_2. The opposite observation holds as well: an OR_4_2 module enables the generation of OR_4_3.

Further reductions can be applied to logic for a parallel counter based on OR elementary symmetric functions. For instance, the third significant bit admits the expression $$S_{t-2} = OR\_n\_(2^t + 2^{t-1} + 2^{t-2}) \vee [\neg$$
$$OR\_n\_$$
$$(2^t + 2^{t-1}) \wedge OR\_n\_(2^t + 2^{t-2})] \vee$$
$$[\neg OR\_n\_2^t \wedge OR\_n\_(2^{t-1} + 2^{t-2})] \vee [\neg$$
$$OR\_n\_2^{t-1} \wedge OR\_n\_2^{t-2}].$$

Another important application of reductions is logic for a conditional parallel counter. A conditional parallel counter is a module with n inputs. Let Q be a subset of $\{0, 1 \ldots n\}$.

The subset determines a condition. The module produces the binary representation of the number of high inputs if this number of high inputs belongs to Q. If the number of high inputs does not belong to Q, the outputs can be any logical function. Such a module can replace a parallel counter if the number of high inputs is in Q.

A useful conditional parallel counter has Q={0, 1 . . . m} for some m≦n. Logic for such a counter can be obtained from logic for a parallel counter with m inputs by replacing every OR_m_k with OR_n_k. For instance, if Q={0,1,2, 3} then a conditional parallel counter has 2 outputs $S_1$, $S_0$ given by $$S_1=OR\_n\_2, S_0=EXOR\_n\_1.$$

Another instance of a conditional parallel counter has Q={0, 1,2,3,4,5}, $$S_2=OR\_n\_4, S_1=\neg OR\_n\_4 \wedge OR\_n\_2, S_0=EXOR\_n\_1.$$

If the number of high inputs for one of these two counters does not belong to Q then the output is the binary representation of the greatest element of Q, i.e., 3=11 or 5=101.

An important application of conditional parallel counters is constant multipliers. A constant multiplier is a module whose inputs form binary representations of two numbers A, B, and outputs comprise the binary representation of the product A*B whenever A is a number that belongs to a set of allowed constants. Since constant multipliers are smaller and faster then multipliers, it is beneficial to use them whenever one can choose one multiplicand from the set of allowed constants. One can do it, for instance, designing a digital filter.

Another aspect of the present invention comprises a technique for multiplication and this will be described hereinafter.

Multiplication is a fundamental operation in digital circuits. Given two n-digit binary numbers $$A_{n-1}2^{n-1}+A_{n-2}2^{n-2}+\ldots+A_12+A_0 \text{ and } B_{n-1}2^{n-1}+B_{n-2}2^{n-2}+\ldots+B_12+B_0.$$

their product $$P_{2n-1}2^{2n-1}+P_{2n-2}2^{2n-2}+\ldots+P_12+P_0$$

has up to 2n digits. Logical circuits generating all $P_i$ as outputs generally follow the scheme in FIG. 14. Wallace has invented the first fast architecture for a multiplier, now called the Wallace-tree multiplier (Wallace, C. S., *A Suggestion for a Fast Multiplier*, IEEs Trans. Electron. Comput. EC-13: 14–17 (1964)). Dadda has investigated bit behaviour in a multiplier (L. Dadda *Some Schemes for Parallel Multipliers*, Alta Freq 34: 349–356 (1965)). He has constructed a variety of multipliers and most multipliers follow Dadda's scheme.

Dadda's multiplier uses the scheme in on FIG. 22. If inputs have 8 bits then 64 parallel AND gates generate an array shown in FIG. 23. The AND gate sign Λ is omitted for clarity so that $A_i\wedge B_j$ becomes $A_iB_j$. The rest of FIG. 23 illustrates array reduction that involves fill adders (FA) and half adders (HA) Bits from the same column are added by half adders or full adders. Some groups of bits fed into a full adder are in rectangles. Some groups of bits fed into a half adder are in ovals. The result of array reduction is just two binary numbers to be added at the last step. One adds these two numbers by one of fast addition schemes, for instance, conditional adder or carry-look-ahead adder.

This aspect of the present invention comprises two preferred steps: array deformation and array reduction using the parallel counter with the accordance with the first aspect of the present invention.

The process of array deformation will now be described.

Some parts of the multiplication array, formed by $A_iB_j$ such as on FIG. 23, have interesting properties. One can write simple formulas for the sum of the bits in these parts. Examples of such special parts are on FIG. 24. In general, chose an integer k, and those $A_iB_j$ in the array such that the absolute value of i−j−k is less or equal to 1 comprise a special part.

Let $S_i$ be the bits of the sum of all the bits of the form $A_iB_j$ shown on FIG. 1 Then $$S_0=A_0\wedge B_0,$$

$$S_1=(A_1\wedge B_0)\oplus(A_0\wedge B_1),$$

$$S_2=(A_1\wedge B_1)\oplus(A_1\wedge B_1\wedge A_0\wedge B_0),$$

$$S_{2k+1}=(A_{k+1}\wedge B_k)\oplus(A_k\wedge B_{k+1})\oplus(A_k\wedge B_k\wedge A_{k-1}\wedge B_{k-1}) \text{ for all } k>0,$$

$$S_{2k}=(A_k\wedge B_k)\oplus(A_{k-1}\wedge B_{k-1}\wedge((A_{k+1}\wedge B_{k+1})\vee(A_{k-1}\wedge B_{k-1}\wedge(A_{k+1}\vee B_{k+1})))) \text{ for all } k>1.$$

These formulas show that the logic for summing the chosen entries in the array does not get large. Whereas if random numbers were summed the logic for the $(n+1)^{th}$ bit is larger than the logic for the $n^{th}$ bit.

Using these formulas, one can generate a different array. The shape of array changes. This is why it is called array deformation. These formulas are important because one can speed up a multiplication circuit by generating an array of a particular shape.

The array in FIG. 25 is for an 8-bit multiplication. The AND gate sign Λ is omitted for clarity so that $A_i\wedge B_j$ becomes $A_iB_j$. Array deformation logic generates X, Y, and Z:

$$X=(A_1\wedge B_6)\oplus(A_0\wedge B_7),$$

$$Y=A_1\wedge B_7\wedge\neg(A_0\wedge B_6),$$

$$Z=A_1\wedge B_7\wedge A_0\wedge B_6.$$

The advantage of this array over one in FIG. 23 is that the maximal number of bits in a column is smaller The array in FIG. 23 has a column with 8 bits. The array on FIG. 25 has 4 columns with 7 bits but none with 8 or more bits. The logic for the generation of X Y and Z is illustrated in FIG. 26. This logic can be used in parallel with the first two fill adders (illustrated in FIG. 2) in the array reduction step thus avoiding delays caused by additional logic.

Array reduction is illustrated in FIG. 25. The first step utilizes 1 half adder, 3 full adders, 1 parallel counter with 4 inputs, 2 parallel counters with 5 inputs, 1 parallel counter with 6 inputs, and 4 parallel counters with 7 inputs. The three parallel counters (in columns 7, 8, and 9) have an implementation based on 7=5+2 partition. The bits X, Y, and Z join the group of two in the partition. The counter in column 6 is implemented on 7=4+3 partition. The counter in column 5 is based on 6=3+3 partition. The remaining counters should not be partitioned. The locations of full adders are indicated by ovals. The half adder is shown by a rectangle.

An adder for adding the final two binary numbers is designed based on arrival time of bits in two numbers. This gives a slight advantage but it is based on common knowledge, that is conditional adder and ripple-carry adder.

Although in this embodiment the addition of two 8 bit numbers has been illustrated, the invention is applicable to any N bit binary number addition. For example for 16 bit addition, the array reduction will reduce the middle column height from 16 to 15 thus allowing two seven bit full adders to be used for the first layer to generate two 3 bit outputs and the left over input can be used with the other two 3 outputs as an input to a further seven input full adder thus allowing the addition of the 16 bits in only two layers.

This aspect of the present invention can be used with the parallel counter of the first aspects of the present invention to provide a fast circuit.

The parallel counter of the first aspects of the present invention has other applications, other than used in the multiplier of one aspect of he present invention. It can be used in RSA and reduced area multipliers. Sometimes, it is practical to build just a fragment of the multiplier. This can happen when the array is too large, for instance in RSA algorithms where multiplicands may have more than more than 1000 bits. This fragment of a multiplier is then used repeatedly to reduce the array. In current implementations, it consists of a collection of fill adders. One can use 7 input parallel counters followed by fill adders instead.

A parallel counter can also be used in circuits for error correction codes. One can use a parallel counter to produce Hamming distance. This distance is useful in digital communication. In particular the Hamming distance has to be computed in certain types of decoders, for instance, the Viterbi decoder or majority-logic decoder.

Given two binary messages $(A_1, A_2, \ldots A_n)$ and $(B_1, B_2, \ldots B_n)$, the Hamming distance between them is the number of indices i between I and n such that $A_i$ and $B_i$ are different. This distance can be computed by a parallel counter whose n inputs are $$(A_1 \oplus B_1, A_2 \oplus B_2, \ldots A_n \oplus B_n).$$

The multiply-and-add operation is fundamental in digital electronics because it includes filtering. Given 2n binary numbers $X_1, X_2, \ldots X_n, Y_1, Y_2, \ldots Y_n$, the result of this operation is $$X_1 Y_1 + X_2 Y_2 + \ldots + X_n Y_n.$$

One can use the multiplier described to implement multiply-and-add in hardware. Another strategy can be to use the scheme in FIG. 22. All partial products in products $X_i Y_i$ generate an array. Then one uses the parallel counter X to reduce the array.

In the present invention, one can use the parallel counter whenever there is a need to add an array of numbers. For instance, multiplying negative number in two-complement form, one generates a different array by either Booth recording (A. D. Booth, *A Signed Binary Multiplication Technique*, Q. J. Mech. Appl. Math, 4: 236–240 (1951)) or another method. To obtain a product one adds this array of numbers.

What is claimed is:

1. A parallel counter comprising:

a plurality of inputs for receiving a binary number as a plurality of binary inputs;

a plurality of outputs for outputting binary outputs indicating the number of binary ones in the plurality of binary inputs, said plurality of outputs including a first output adapted to output a least significant bit of the binary outputs and at least one other output adapted to output at least one higher significant bit of the binary outputs; and a logic circuit connected between the plurality of inputs and the plurality of outputs and for generating at least one of said at least one higher significant bit of the binary outputs as an elementary EXOR symmetric function of the binary inputs;

wherein the logic circuit comprises elementary EXOR symmetric function logic for generating said elementary EXOR symmetric function of the binary inputs, the elementary EXOR symmetric function logic equating to at least one of:

(i) the EXOR logic combination of the binary inputs and is high if and only if $m \geq 1$ and the number of high inputs is an odd number, (ii) the AND logic combination of sets of the binary inputs and the EXOR logic combination of the AND logic combinations and is high if and only if $m \geq k$ and the number of sets of high inputs is an odd number, where k is the size of the sets of binary inputs, each set being unique and the sets covering all possible combinations of binary inputs, or (iii) the AND logic combination of the binary inputs and is high if and only if all said binary inputs are high;

wherein said elementary EXOR symmetric function logic is divided into a plurality of EXOR logic units, each EXOR logic unit is arranged to generate logic unit binary outputs as an elementary EXOR symmetric function of the binary inputs to the EXOR logic unit, the binary inputs of said plurality of inputs are divided into inputs to a plurality of said EXOR logic units, and at least one said higher significant bit of the binary outputs is generated using said logic unit binary outputs of a plurality of said EXOR logic units.

2. A parallel counter according to claim 1, wherein said logic circuit is arranged to generate at least one of the binary outputs as an elementary OR symmetric function of the binary inputs using elementary OR symmetric function logic, wherein said elementary OR symmetric function logic equates to at least one of:

(i) the OR logic combination of the binary inputs and is high if and only if $m \geq 1$, (ii) the AND logic combination of sets of the binary inputs and the OR logic combination of the AND logic combinations and is high if and only if $m \geq k$, where k is the size of the sets of binary inputs, each set being unique and the sets covering all possible combinations of binary inputs, or (iii) the AND logic combination of the binary inputs and is high if and only if all said binary inputs are high;

and said elementary OR symmetric function logic is divided into a plurality of OR logic units, the binary inputs of said plurality of inputs are divided according to a binary tree into inputs into a plurality of said OR logic units, each OR logic unit is arranged to generate at least one logic unit binary output as an elementary OR symmetric function of the binary inputs to the OR logic unit, the binary inputs of said plurality of inputs are divided into inputs to a plurality of said OR logic units, at least one binary output of said plurality of outputs is generated using said logic unit binary outputs of a plurality of said OR logic units.

3. A parallel counter according to claim 2, wherein said OR logic units are arranged to receive $2^n$ of said binary inputs, where n is an integer indicating the level of the OR logic units in the binary tree, said elementary OR symmetric function logic has p OR logic units at each level, where p is a rounded up integer determined from (the number of binary inputs)/$2^n$, OR logic units having a higher level in the binary tree comprise logic of OR logic units at lower levels in the binary tree, and each OR logic unit is arranged to generate logic unit binary outputs as an elementary OR symmetric function of the binary inputs to the OR logic unit.

4. A logic circuit for multiplying two binary numbers comprising:
  array generation logic for generating an array of binary numbers comprising combinations of bits of each binary number;
  array reduction logic including at least one parallel counter for reducing the number of combinations in the array; and
  binary addition logic for adding the reduced combinations to generate an output;
  wherein at least one said parallel counter comprises:
    at least five inputs for receiving a plurality of binary inputs;
    at least three outputs for outputting binary outputs indicating the number of binary ones in the plurality of binary inputs, said at least three outputs including a first output for outputting a least significant bit of the binary outputs and at least one other output for outputting at least one higher significant bit of the binary outputs; and
    a logic circuit connected between the inputs and the outputs, comprising elementary EXOR symmetric function logic for generating at least one of said at least one higher significant bit of the binary outputs as an elementary EXOR symmetric function of the binary inputs;
    wherein the elementary EXOR symmetric function logic equates to AND logic for combining sets of binary inputs and EXOR logic for combining the AND logic combined sets of binary inputs to generate a binary output which is high if and only if m≧k and the number of sets of high inputs is an odd number, where m is the number of high inputs and k is the size of the sets of binary inputs, each set is unique, the sets cover all possible combinations of binary inputs, said elementary EXOR symmetric function logic is divided into a plurality of EXOR logic units, each EXOR logic unit includes logic to generate logic unit binary outputs as an elementary EXOR symmetric function of the binary inputs to the EXOR logic unit, the binary inputs of said at least five inputs are divided into inputs to a plurality of said EXOR logic units, and at least one said higher significant bit of the binary outputs is generated using said logic unit binary outputs of a plurality of said EXOR logic units.

5. A method of designing a logic circuit comprising:
  providing a library of logic module designs each for performing an elementary symmetric function;
  designing a logic circuit to perform a large elementary symmetric function comprising an elementary symmetric function having a larger number of inputs that said elementary symmetric functions performed by said logic module designs;
  identifying elementary symmetric functions for the performance of said large elementary symmetric function;
  selecting logic module designs from said library to perform some of said identified elementary symmetric functions;
  identifying at least one logic module design in the selected logic module designs which performs an elementary symmetric function which has a relationship to another elementary symmetric function for the performance of said large elementary symmetric function; and
  using said at least one identified logic module design with inverters to perform said other elementary symmetric function using the relationship between the symmetric functions:

$$OR\_n\_k(X_1 \ldots X_n) = \neg OR\_n\_(n+1-k)(\neg X_1 \ldots \neg X_n)$$

where $\neg$ denotes an inversion, n is the number of inputs, and k is the number of sets of inputs AND combined together.

6. A conditional parallel counter having m possible high inputs out of n inputs, where m<n, and n and m are integers, the counter comprising a parallel counter for counting inputs to generate p outputs for m inputs, wherein the number n of inputs to the counter is greater than $2^p$, and said parallel counter comprises:
  at least five inputs for receiving a plurality of binary inputs;
  at least three outputs for outputting binary outputs indicating the number of binary ones in the plurality of binary inputs, said plurality of outputs including a first output for outputting a least significant bit of the binary outputs and at least one other output for outputting at least one higher significant bit of the binary outputs; and
  a logic circuit connected between the inputs and the outputs, comprising elementary EXOR symmetric function logic for generating at least one of said at least one higher significant bit of the binary outputs as an elementary EXOR symmetric function of the binary inputs;
  wherein the elementary EXOR symmetric function logic equates to AND logic for combining sets of binary inputs and EXOR logic for combining the AND logic combined sets of binary inputs to generate a binary output which is high if and only if m≧k and the number of sets of high inputs is an odd number, where m is the number of high inputs and k is the size of the sets of binary inputs, each set is unique, the sets cover all possible combinations of binary inputs, said elementary EXOR symmetric function logic is divided into a plurality of EXOR logic units, each EXOR logic unit includes logic adapted to generate logic unit binary outputs as an elementary EXOR symmetric function of the binary inputs to the EXOR logic unit, the binary inputs of said plurality of inputs are divided into inputs to a plurality of said EXOR logic units, and at least one said higher significant bit of the binary outputs is generated using said logic unit binary outputs of a plurality of said EXOR logic units.

7. A constant multiplier comprising a conditional parallel counter having m possible high inputs out of n inputs, where m<n, and n and m are integers, the conditional parallel counter comprising a parallel counter for counting inputs to generate p outputs for m inputs, wherein the number n of inputs to the counter is greater than $2^p$, and said parallel counter comprises:
- at least five inputs for receiving a plurality of binary inputs;
- at least three outputs for outputting binary outputs indicating the number of binary ones in the plurality of binary inputs, said outputs including a first output for outputting a least significant bit of the binary outputs and at least one other output for outputting at least one higher significant bit of the binary outputs; and
- a logic circuit connected between the inputs and the outputs, comprising elementary EXOR symmetric function logic for generating at least one of said at least one higher significant bit of the binary outputs as an elementary EXOR symmetric function of the binary inputs;
- wherein the elementary EXOR symmetric function logic equates to AND logic for combining sets of binary inputs and EXOR logic combining the AND logic combined sets of binary inputs to generate a binary output which is high if and only if m≧k and the number of sets of high inputs is an odd number, where m is the number of high inputs and k is the size of the sets of binary inputs, each set is unique, the sets cover all possible combinations of binary inputs, said elementary EXOR symmetric function logic is divided into a plurality of EXOR logic units, each EXOR logic unit includes logic adapted to generate logic unit binary outputs as an elementary EXOR symmetric function of the binary inputs to the EXOR logic unit, the binary inputs of said plurality of inputs are divided into inputs to a plurality of said EXOR logic units, and at least one said higher significant bit of the binary output of said plurality of outputs is generated using said logic unit binary outputs of a plurality of said EXOR logic units.

8. A digital filter comprising a conditional parallel counter having m possible high inputs out of n inputs, where m<n, and n and m are integers, the conditional parallel counter comprising a parallel counter for counting inputs to generate p outputs for m inputs, wherein the number n of inputs to the counter is greater than $2^p$, and said parallel counter comprises:
- at least five inputs for receiving a binary number as a plurality of binary inputs;
- at least three outputs for outputting binary outputs indicating the number of binary ones in the plurality of binary inputs, said outputs including a first output for outputting a least significant bit of the binary outputs and at least one other output for outputting at least one higher significant bit of the binary outputs; and
- a logic circuit connected between the inputs and the outputs, comprising elementary EXOR symmetric function logic for generating at least one of said at least one higher significant bit of the binary outputs as an elementary EXOR function of the binary inputs;
- wherein the elementary EXOR symmetric function logic equates to AND logic for combining sets of binary inputs and EXOR logic for combining the AND logic combined sets of binary inputs to generate a binary output which is high if and only if m≧k and the number of sets of high inputs is an odd number, where m is the number of high inputs and k is the size of the sets of binary inputs, each set is unique, the sets cover all possible combinations of binary inputs, said elementary EXOR symmetric function logic is divided into a plurality of EXOR logic units, each EXOR logic unit includes logic to generate logic unit binary outputs as an elementary EXOR symmetric function of the binary inputs to the EXOR logic unit, the binary inputs of said plurality of inputs are divided into inputs to a plurality of said EXOR logic units, and at least one said higher significant bit of the binary outputs is generated using said logic unit binary outputs of a plurality of said EXOR logic units.

9. A parallel counter comprising:
- at least five inputs for receiving a plurality of binary inputs;
- at least three outputs for outputting binary outputs indicating the number of binary ones in the plurality of binary inputs; and
- a logic circuit connected between the inputs and the outputs, comprising elementary EXOR symmetric function logic for generating at least two of the plurality of binary outputs as elementary EXOR symmetric functions of the binary inputs,
- wherein the elementary EXOR symmetric function logic equates to at least one of:
  (i) first EXOR logic for combining the binary inputs to generate a binary output which is high if and only if m≧1 and the number of high inputs is an odd number,
  (ii) AND logic for combining sets of binary inputs and second EXOR logic for combining the AND logic combined sets of binary inputs to generate a binary output which is high if and only if m≧k and the number of sets of high inputs is an odd number, and
  (iii) the AND logic combination of the binary inputs and is high if and only if all said binary inputs are high;
- where m is the number of high inputs and k is the size of the sets of binary inputs, each set being unique and the sets covering all possible combinations of binary inputs.

10. A parallel counter according to claim 9 wherein said elementary EXOR symmetric function logic is arranged to generate first and second binary outputs as elementary EXOR symmetric functions of the binary inputs.

11. A parallel counter according to claim 10 wherein said first EXOR logic is adapted to generate the first binary output, and said AND logic and said second EXOR logic are adapted to generate the second binary output.

12. A parallel counter according to claim 9 wherein said first EXOR logic is arranged to generate the first binary output, said AND logic is adapted to generate at least one $(i+1)^{th}$ binary output by AND logic combining $2^i$ of the binary inputs in each set, and said second EXOR logic is adapted to combine the result of the AND logic combinations, where i is an integer from 1 to N−1, N is the number of binary outputs and i represents the significance of a binary output.

13. A parallel counter according to claim 9 wherein said logic circuit includes elementary OR symmetric function logic to generate at least one of the binary outputs as an elementary OR symmetric function of the binary inputs, wherein the elementary OR symmetric function logic comprises at least one of OR logic for combining binary inputs to generate a binary output which is high if and only if $m \geq 1$, and AND logic for combining sets of binary inputs and OR logic for combining the AND logic combined sets of binary inputs to generate a binary output which is high if and only if $m \geq K$.

14. A parallel counter according to claim 13 wherein said elementary OR symmetric function logic is arranged to generate the $N^{th}$ binary output as an elementary OR symmetric function, wherein said AND logic is arranged to AND logic combine $2^{N-1}$ of the binary inputs in each set and said OR logic is arranged to OR logic combine the AND logic combined sets of binary inputs, where N is the number of binary outputs and the $N^{th}$ binary output is the most significant.

15. A parallel counter according to claim 9 wherein said elementary EXOR symmetric function logic is arranged to generate a first binary output as an elementary EXOR symmetric function of the binary inputs, and said logic circuit includes elementary OR symmetric function logic to generate an $N^{th}$ binary output as an elementary OR symmetric function of the binary inputs, wherein the elementary OR symmetric function logic comprises at least one of first OR logic for combining binary inputs to generate a binary output which is high if and only if $m \geq 1$, and AND logic for combining sets of binary inputs and second OR logic for combining the AND logic combined sets of binary inputs to generate a binary output which is high if and only if $m \geq k$.

16. A parallel counter according to claim 9 wherein said logic circuit includes elementary OR symmetric function logic to generate a plurality of possible binary outputs for a binary output less significant than the $N^{th}$ binary output, as elementary OR symmetric functions of the binary inputs, where N is the number of binary outputs, the sets used for each possible binary output being of different sizes which are a function of the binary output being generated; and selector logic to select one of the possible binary outputs based on a more significant binary output value.

17. A parallel counter according to claim 16 wherein said elementary OR symmetric function logic is arranged to generate the possible binary outputs for the $(N-1)^{th}$ binary output less significant than the $N^{th}$ binary output, as elementary OR symmetric functions of the binary inputs, the sets used for each possible binary output being of size $2^{N-1}+2^{N-2}$ and $2^{N-2}$ respectively and said selector logic being arranged to select one of the possible binary outputs based on the $N^{th}$ binary output value.

18. A parallel counter according to claim 9 wherein said AND logic and said EXOR logic include a plurality of subcircuit logic modules each generating intermediate binary outputs as an elementary EXOR symmetric function of some of the binary inputs, and logic for logically combining the intermediate binary outputs to generate said binary outputs.

19. A logic circuit for multiplying two binary numbers, the logic circuit comprising:

array generation logic for logically combining bits of the binary numbers to generate an array of logical combinations;

array reduction logic for reducing the depth of the array to two binary numbers; and addition logic for adding the binary values of the two binary numbers;

wherein said array reduction logic includes at least one parallel counter comprising:

at least five inputs for receiving a plurality of binary inputs;

at least three outputs for outputting binary outputs indicating the number of binary ones in the binary inputs; and a logic circuit connected between the inputs and the outputs and for generating at least two of the binary outputs as elementary EXOR symmetric functions of the binary inputs, wherein said logic circuit comprises elementary EXOR symmetric function logic for generating said elementary EXOR symmetric function of the binary inputs, the elementary EXOR symmetric function logic equating to at least one of:

(i) first EXOR logic for combining the binary inputs to generate a binary output which is high if and only if $m \geq 1$ and the number of high inputs is an odd number, (ii) AND logic for combining sets of binary inputs and second EXOR logic for combining the AND logic combined sets of binary inputs to generate a binary output which is high if and only if $m \geq k$ and the number of said sets of inputs having all high binary inputs is an odd number, and (iii) AND logic for combining the binary inputs and is high if and only if all said binary inputs are high;

where m is the number of high inputs and k is the size of the sets of binary inputs, each set being unique and the sets covering all possible combinations of binary inputs.

* * * * *